(12) United States Patent
Mok et al.

(10) Patent No.: US 11,466,115 B2
(45) Date of Patent: Oct. 11, 2022

(54) POROUS MEMBRANES INCLUDING TRIBLOCK COPOLYMERS

(71) Applicant: 3M INNOVATIVE PROPERTIES COMPANY, St. Paul, MN (US)

(72) Inventors: Michelle M. Mok, St. Paul, MN (US); Lucas D. McIntosh, Minneapolis, MN (US); Carl A. Laskowski, Minneapolis, MN (US); Timothy M Gillard, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 146 days.

(21) Appl. No.: 16/982,258

(22) PCT Filed: May 29, 2019

(86) PCT No.: PCT/IB2019/054460
§ 371 (c)(1),
(2) Date: Sep. 18, 2020

(87) PCT Pub. No.: WO2019/229680
PCT Pub. Date: Dec. 5, 2019

(65) Prior Publication Data
US 2021/0079149 A1 Mar. 18, 2021

Related U.S. Application Data

(60) Provisional application No. 62/679,402, filed on Jun. 1, 2018.

(51) Int. Cl.
*C08F 297/04* (2006.01)
*B01D 67/00* (2006.01)
*B01D 69/02* (2006.01)
*B01D 71/24* (2006.01)
*B01D 71/28* (2006.01)
*B01D 71/80* (2006.01)

(52) U.S. Cl.
CPC ...... *C08F 297/046* (2013.01); *B01D 67/0013* (2013.01); *B01D 69/02* (2013.01); *B01D 71/24* (2013.01); *B01D 71/28* (2013.01); *B01D 71/80* (2013.01); *B01D 2325/022* (2013.01); *B01D 2325/04* (2013.01); *C08F 2800/20* (2013.01); *C08F 2810/40* (2013.01); *C08F 2810/50* (2013.01)

(58) Field of Classification Search
CPC ......... B01D 71/80; B01D 71/28; B01D 71/26
See application file for complete search history.

(56) References Cited

U.S. PATENT DOCUMENTS

| 3,333,024 A | 7/1967 | Haefele |
|---|---|---|
| RE27,145 E | 6/1971 | Jones |
| 3,595,942 A | 7/1971 | Wald |
| 4,039,593 A | 8/1977 | Kamienski |
| 4,874,818 A | 10/1989 | Yamamoto |
| 5,321,148 A | 6/1994 | Schwindeman |
| 5,352,744 A | 10/1994 | Bates |
| 5,468,574 A | 11/1995 | Ehrenberg |
| 5,612,422 A | 3/1997 | Hucul |
| 5,645,253 A | 7/1997 | Hoshino |
| 5,700,878 A | 12/1997 | Hucul |
| 6,160,054 A | 12/2000 | Schwindeman |
| 6,184,338 B1 | 2/2001 | Schwindeman |
| 6,197,891 B1 | 3/2001 | Schwindeman |
| 6,221,991 B1 | 4/2001 | Letchford |
| 6,429,260 B1 | 8/2002 | Plaver |
| 6,632,890 B1 | 10/2003 | Bates |
| 7,614,507 B2 | 11/2009 | Mitchell |
| 7,740,968 B2 | 6/2010 | Yamashita |
| 7,985,484 B2 | 7/2011 | Hoshi et al. |
| 8,569,072 B2 | 10/2013 | Halverson |
| 8,586,637 B2 | 11/2013 | Vachon |
| 8,685,746 B2 | 4/2014 | Halverson |
| 9,127,112 B2 | 9/2015 | Kosaka |

(Continued)

FOREIGN PATENT DOCUMENTS

| CN | 1344279 | 4/2002 |
|---|---|---|
| CN | 1439034 | 8/2003 |

(Continued)

OTHER PUBLICATIONS

Cohen, "Cobalt Catalysts for the Alternating Copolymerization of Propylene Oxide and Carbon Dioxide: Combining High Activity and Selectivity", Journal of the American Chemical Society, 2005, vol. 127, No. 31, pp. 10869-10878.

Falk, "Lithium Based Coordination Catalysts for The Hydrogenation of Diene and Vinylaromatic Polymers", Die Makromolekulare Chemie, 1972, vol. 160, No. 01, pp. 291-299.

Gehlsen, "Heterogeneous Catalytic Hydrogenation of Poly(styrene): Thermodynamics of Poly(Vinylcyclohexane) Containing Diblock Copolymers", Macromolecules, 1993, vol. 26, No. 16, pp. 4122-4127.

Greene, "Protective Groups in Organic Synthesis", Second Edition, 1991, p. 41.

(Continued)

*Primary Examiner* — Ryan B Huang
(74) *Attorney, Agent, or Firm* — Adrian L. Pishko

(57) ABSTRACT

A porous membrane includes a triblock copolymer of the formula ABC. B is a hydrogenated vinyl aromatic block present in a range from 30 to 90 weight percent, based on the total weight of the copolymer and has a $T_g$ of $\geq 110°$ C. C is a rubbery block present in a range from 10 to 70 weight percent, based on the total weight of the copolymer and has a $T_g \leq 25°$ C. A is substantially incompatible with both the B and C blocks and is derived from ring-opening polymerization. B+C is present in a range from 70 to 95 weight percent, based on the total weight of the copolymer.

20 Claims, 4 Drawing Sheets

(56) References Cited

U.S. PATENT DOCUMENTS

| | | |
|---|---|---|
| 9,429,366 B2 | 8/2016 | Dubois |
| 9,527,041 B2 | 12/2016 | Wiesner |
| 2008/0039584 A1 | 2/2008 | Bening |
| 2009/0148744 A1 | 6/2009 | Fehervari |
| 2009/0173684 A1 | 7/2009 | Tryti |
| 2009/0173694 A1 | 7/2009 | Peinemann |
| 2013/0015071 A1 | 1/2013 | Willis |
| 2013/0101767 A1 | 4/2013 | Wei |
| 2013/0108880 A1 | 5/2013 | Tan |
| 2013/0240438 A1 | 9/2013 | Willis |
| 2014/0360975 A1 | 12/2014 | Hustad |
| 2015/0217237 A1 | 8/2015 | Abetz |
| 2015/0336058 A1 | 11/2015 | Hillmyer |
| 2019/0359778 A1* | 11/2019 | Laskowski ........... C08G 81/027 |

FOREIGN PATENT DOCUMENTS

| | | |
|---|---|---|
| CN | 101155845 B | 11/2010 |
| CN | 101228193 B | 7/2012 |
| CN | 102178660 | 8/2012 |
| CN | 103827157 | 5/2014 |
| EP | 3147024 | 3/2017 |
| JP | 2000219767 | 8/2000 |
| WO | WO 2001-42355 | 6/2001 |
| WO | 2007/010039 A1 | 1/2007 |
| WO | 2007/010042 A1 | 1/2007 |
| WO | WO 2007-137257 | 11/2007 |
| WO | WO 2008-034487 | 3/2008 |
| WO | WO 2008-150779 | 12/2008 |
| WO | WO 2009-067503 | 5/2009 |
| WO | WO 2010-078404 | 7/2010 |
| WO | WO 2016-149235 | 9/2016 |
| WO | WO 2016-149571 | 9/2016 |
| WO | WO 2018-097988 | 5/2018 |
| WO | WO 2018-140147 | 8/2018 |
| WO | WO 2018-152075 | 8/2018 |

OTHER PUBLICATIONS

Greene, "Protective Groups in Organic Synthesis", Second Edition, 1991, pp. 80-83.
Hsieh, "General Aspects of Anionic Polymerization", Anionic Polymerization: Principles and Practical Applications, Chapter 5, 1996, pp. 93-127. Need to obtain chapter 23.
Hsieh, "Anionic Polymerization of Methyl methacrylate and Related Polar Monomers,", Anionic Polymerization: Principles and Practical Applications, Chapter 23, 1996, pp. 641-727.
Hucul, "Catalytic Hydrogenation of Polystyrene", Advanced Materials, 2000, vol. 12, No. 23, pp. 1855-1858.
Kawakami, "Silicone Macromers for Graft Polymer Synthesis", Polymer Journal, 1982, vol. 14, No. 11, pp. 913-917.
Kawakami, "Synthesis of Silicone Graft Polymers and a Study of Their Surface Activity Properties", Makromolecules Chemistry, 1984, vol. 185, No. 01, pp. 09-18.
Nakanishi, "Improvement of The Conductivity of Polydiacetylenes By Chemical and Physical Methods", ACS Polymer Preprints, 1984, vol. 25, No. 01, pp. 244-245.
Ndoni, "Laboratory-Scale Setup for Anionic Polymerization under Inert Atmosphere", Review of Scientific Instruments, American Institute of Physics, 1995, vol. 66, No. 02, pp. 1090-1095.
Sperschneider, "Towards Nanoporous Membranes Based on ABC Triblock Terpolymers", Small, 2007, vol. 03, No. 06, pp. 1056-1063.
Su, "Ring-Opening Polymerization", Principles of Polymer Design and Synthesis, Chapter 11, 2013, pp. 267-299.
Wolf, "Ordered Nanoporous Poly(cyclohexylethylene)", Langmuir, 2003, vol. 19, No. 16, pp. 6553-6560.
International Search Report for PCT International Application No. PCT/IB2019/054460, dated Sep. 9, 2019, 3 pages.

* cited by examiner

POROUS MEMBRANES INCLUDING TRIBLOCK COPOLYMERS

CROSS REFERENCE TO RELATED APPLICATIONS

This application is a national stage filing under 35 U.S.C. 371 of PCT/IB2019/054460, filed May 29, 2019, which claims the benefit of U.S. Application No. 62/679,402, filed Jun. 1, 2018, the disclosure of which is incorporated by reference in its/their entirety herein.

BACKGROUND

Porous polymers membranes are used as size-exclusion filters in a variety of industries, including water treatment, food and beverage preparation, and medical/biopharmaceutical. The biopharmaceutical industry places particularly rigorous demands on membranes, including high-temperature stability (e.g., 121° C. autoclave sterilization) and mechanical robustness. Polyethersulfone (PES) has been considered state-of-the-art membrane material because it can meet or exceed the requirements for biopharmaceutical separations.

PES membranes are typically prepared via phase inversion processes (e.g., vapor- or solvent-induced phase separation (VIPS or SIPS)). The morphology of phase inversion membranes can be controlled through a combination of formulation and process conditions. Despite extensive formulation and process optimization, the performance of homopolymer-based membranes such as PES is ultimately limited by a wide distribution of pore sizes and shapes, especially at or near the relevant surface.

SUMMARY

The present disclosure describes triblock polymers of the formula ABC, wherein B is a hydrogenated vinyl aromatic block having a $T_g$ of $\geq 110°$ C.; C is a rubbery block having a $T_g \leq 25°$ C.; and A is a block substantially incompatible with the B and C blocks. The triblock copolymers have in a range from 30 to 90 weight percent of the B block, 10 to 70 weight percent of the C block and in a range from 70 to 95 weight percent of the B and C blocks. These polymers display a unique combination of solution self-assembly and film mechanical properties. Specifically, when formed into films (or cast as membranes) they display significant improvements in thermal tolerance relative to unhydrogenated triblock copolymer materials.

Membranes formed from such triblock copolymers can exhibit glass transition temperatures that are higher than similar unsaturated block copolymers, as well as enhanced mechanical robustness. As such, disclosed membranes combine the morphological control offered by block copolymers with temperature stability and mechanical robustness.

Various aspects of the present disclosure relate to a porous membrane including a triblock copolymer of the formula ABC. B is a hydrogenated vinyl aromatic block present in a range from 30 to 90 weight percent, based on the total weight of the copolymer and has a $T_g$ of $\geq 110°$ C. C is a rubbery block present in a range from 10 to 70 weight percent, based on the total weight of the copolymer and has a $T_g \leq 25°$ C. A is substantially incompatible with both the B and C blocks and is derived from ring-opening polymerization. B+C is present in a range from 70 to 95 weight percent, based on the total weight of the copolymer.

Various aspects of the present disclosure relate to a shaped article including a porous membrane comprising a triblock copolymer of the formula ABC. B is a hydrogenated vinyl aromatic block present in a range from 30 to 90 weight percent, based on the total weight of the copolymer and has a $T_g$ of $\geq 110°$ C. C is a rubbery block present in a range from 10 to 70 weight percent, based on the total weight of the copolymer and has a $T_g \leq 25°$ C. A is substantially incompatible with both the B and C blocks and is derived from ring-opening polymerization. B+C is present in a range from 70 to 95 weight percent, based on the total weight of the copolymer.

Various aspects of the present disclosure relate to a filter including a porous membrane that includes a triblock copolymer of the formula ABC. B is a hydrogenated vinyl aromatic block present in a range from 30 to 90 weight percent, based on the total weight of the copolymer and has a $T_g$ of $\geq 110°$ C. C is a rubbery block present in a range from 10 to 70 weight percent, based on the total weight of the copolymer and has a $T_g \leq 25°$ C. A is substantially incompatible with both the B and C blocks and is derived from ring-opening polymerization. B+C is present in a range from 70 to 95 weight percent, based on the total weight of the copolymer.

Various aspects of the present disclosure relate to a kit includes a filter including a porous membrane that includes a triblock copolymer of the formula ABC. B is a hydrogenated vinyl aromatic block present in a range from 30 to 90 weight percent, based on the total weight of the copolymer and has a $T_g$ of $\geq 110°$ C. C is a rubbery block present in a range from 10 to 70 weight percent, based on the total weight of the copolymer and has a $T_g \leq 25°$ C. A is substantially incompatible with both the B and C blocks and is derived from ring-opening polymerization. B+C is present in a range from 70 to 95 weight percent, based on the total weight of the copolymer. The kit also includes a package for containing the filter.

Various aspects of the present disclosure relate to a method of preparing a porous membrane. The method includes dissolving a triblock copolymer of the formula ABC in a solvent system to form a triblock copolymer solution. B is a hydrogenated vinyl aromatic block present in a range from 30 to 90 weight percent, based on the total weight of the copolymer and has a $T_g$ of $\geq 110°$ C. C is a rubbery block present in a range from 10 to 70 weight percent, based on the total weight of the copolymer and has a $T_g \leq 25°$ C. A is substantially incompatible with both the B and C blocks and is derived from ring-opening polymerization. B+C is present in a range from 70 to 95 weight percent, based on the total weight of the copolymer. The method also includes forming a precursor article from the triblock copolymer solution, removing at least a portion of the solvent system from the precursor article to form a partially dried precursor article; and contacting the partially dried precursor article with a nonsolvent, thereby forming the porous membrane.

As used herein, the terms "polymer" and "polymeric material" include, but are not limited to, organic homopolymers, copolymers (e.g., block, graft, random and alternating copolymers, terpolymers, and blends, and modifications thereof). Furthermore, unless otherwise specifically limited, the term "polymer" shall include all possible geometrical configurations of the material. These configurations include, but are not limited to, cis-, trans-, isotactic, syndiotactic, and atactic symmetries.

As used herein, the term "comprises" and variations thereof do not have a limiting meaning where these terms appear in the description and claims. Such terms will be understood to imply the inclusion of a stated step or element or group of steps or elements but not the exclusion of any other step or element or group of steps or elements. By "consisting of" is meant including, and limited to, whatever follows the phrase "consisting of" Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements. Any of the elements or combinations of elements that are recited in this specification in open-ended language (for example, comprise and derivatives thereof), are considered to additionally be recited in closed-ended language (e.g., consist and derivatives thereof) and in partially closed-ended language (e.g., consist essentially, and derivatives thereof).

In this application, terms such as "a," "an," and "the" are not intended to refer to only a singular entity, but include the general class of which a specific example may be used for illustration. The terms "a," "an," and "the" are used interchangeably with the term "at least one." The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise.

The term "and/or" means one or all of the listed elements or a combination of any two or more of the listed elements.

As used herein, all numbers are assumed to be modified by the term "about" and in certain embodiments, preferably, by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used. Herein, "at least," "at most," and "up to" a number (e.g., up to 50) includes the number (e.g., 50).

As used herein, the recitations of numerical ranges by endpoints include all numbers subsumed within that range as well as the endpoints (e.g., 1 to 5 includes 1, 1.5, 2, 2.75, 3, 3.80, 4, 5, etc.).

The terms "in the range," "ranging from," and "within a range" (and similar statements) includes the endpoints of the stated range.

Groupings of alternative elements or embodiments disclosed herein are not to be construed as limitations. Each group member may be referred to and claimed individually or in any combination with other members of the group or other elements found therein. It is anticipated that at least one member of a group may be included in, or deleted from, a group for reasons of convenience and/or patentability. When any such inclusion or deletion occurs, the specification is herein deemed to contain the group as modified thus fulfilling the written description of all Markush groups used in the appended claims.

Reference throughout this specification to "one embodiment," "an embodiment," "certain embodiments," or "some embodiments," etc., means that a particular feature, configuration, composition, or characteristic described in connection with the embodiment is included in at least one embodiment of the invention. Thus, the appearances of such phrases in various places throughout this specification are not necessarily referring to the same embodiment of the invention. Furthermore, the particular features, configurations, compositions, or characteristics may be combined in any suitable manner in at least one embodiment.

The above summary of the present disclosure is not intended to describe each disclosed embodiment or every implementation of the present invention. The description that follows more particularly exemplifies illustrative embodiments. In several places throughout the application, guidance is provided through lists of examples, which examples may be used in various combinations. In each instance, the recited list serves only as a representative group and should not be interpreted as an exclusive list. Thus, the scope of the present disclosure should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Although various theories and possible mechanisms may have been discussed herein, in no event should such discussions serve to limit the claimable subject matter.

DETAILED DESCRIPTION

Figure 1A:
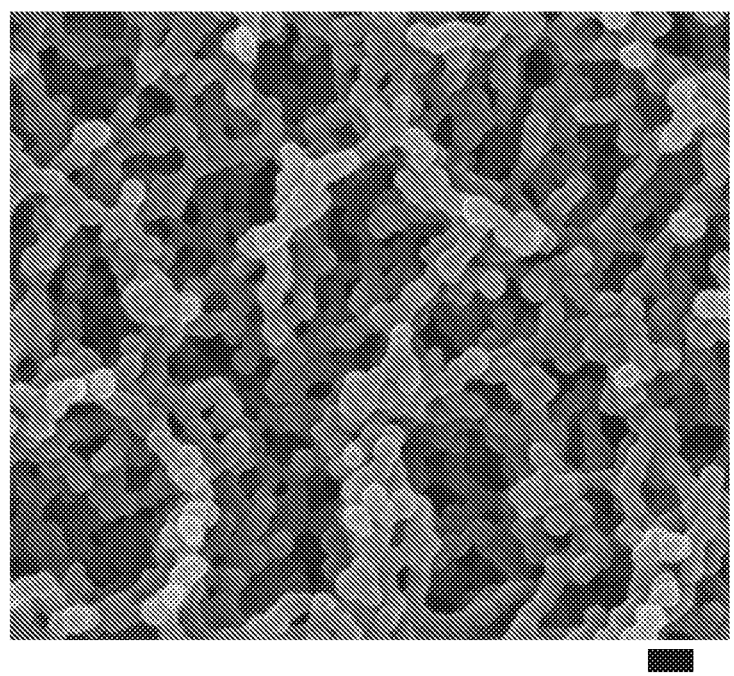
FIGS. 1A, 1B, and 1C are scanning electron microscope (SEM) images of sample EX-1D at 50 kx (FIG. 1A), EX-1C at 1160× (FIG. 1B) and EX-1D at 880× (FIG. 1C).

Novel triblock polymers of the formula ABC are provided, wherein B is a hydrogenated vinyl aromatic block having a $T_g$ of ≥110° C.; C is a rubbery block having a $T_g$≤25° C.; and A is a block incompatible with the B and C blocks. The triblock copolymers have in a range from 30 to 90 weight percent of the B block, 10 to 70 weight percent of the C block and in a range from 65 to 95 weight percent of the B and C blocks.

The "B" block of the copolymer comprises polymeric units that form hard, glassy domains upon polymerization and hydrogenation, with the hydrogenated B block having a $T_g$ of at least 110° C. (in some embodiments, at least 115° C., or even at least 130° C.). The B block polymer domain comprises a total of 30 to 90 weight percent of the triblock copolymer.

The glassy B blocks are typically selected from fully or partially hydrogenated vinyl aromatic monomers and include hydrogenated products of styrene, α-methylstyrene, 4-methylstyrene, 3-methylstyrene, 4-ethylstyrene, 3,4-dimethylstyrene, 2,4,6-trimethylstyrene, 3-tert-butyl-styrene, 4-tert-butylstyrene, 4-methoxystyrene, 4-trimethylsilylstyrene, 2,6-dichlorostyrene, vinyl naphthalene, 4-chlorostyrene, 3-chlorostyrene, 4-fluorostyrene, 4-bromostyrene, vinyl toluene, ethylstyrene, diethyl styrene, di-n-butylstyrene, isopropylstyrene, other alkylated-styrenes, styrene analogs, and styrene homologs such as vinyl naphthalene, and vinyl anthracene. On full hydrogenation, the resulting blocks may be considered poly(cyclohexylethyl) blocks. It will be understood that the hydrogenation of the copolymer may partially hydrogenate the B blocks leading to a mixture of poly(cyclohexylethyl) and poly(vinyl aromatic) repeat units (e.g., poly(styrene)).

Generally, the B blocks of the copolymer are present in a range from 30 to 90 (in some embodiments, in a range from 60 to 80, or even 45 to 65) wt. % of the copolymer.

The nature and composition of the monomers which make up the individual C block is not particularly critical so long as the polymerized monomers provide a phase which meets the glass temperature requirement and, thus, can be described as "soft" or "rubbery." These terms are used interchangeably throughout the specification. It will be understood that "amorphous" blocks contain no or negligible amounts of crystallinity. The amount of crystallinity can be determined using differential scanning calorimetry (DSC), for example.

In particular embodiments, each block C is independently selected from the group consisting of polymerized (i) conjugated diene monomers, or (ii) a silicon polymer, and (iii) mixtures of monomers wherein segments containing polymerized conjugated diene monomers are fully or partially hydrogenated. Suitable conjugated dienes include, for example, butadiene, isoprene, as well as 1,3-cyclodiene monomers (e.g., 1,3-cyclohexadiene, 1,3-cycloheptadiene and 1,3-cyclooctadiene), preferably 1,3-cyclohexadiene. When the C blocks of conjugated acyclic dienes (e.g., butadiene) or mixtures thereof are optionally hydrogenated (e.g., blocks should have a C=C content of in a range from 0 to 40 mole percent post hydrogenation). C blocks resulting from hydrogenation include, but are not limited to, poly(ethylene-alt-propylene), poly(butylene), poly(ethylene-co-butylene), and poly(ethylene-co-propylene-co-butylene).

Additionally, the C blocks may be polymer blocks of silicon rubber segments (i.e., blocks of organopolysiloxanes having recurring units of —[Si($R^{10}$)$_2$—O]— wherein each $R^{10}$ denotes an organic radical (e.g., alkyl, cycloalkyl or aryl)). Such blocks of organopolysiloxanes may be prepared by anionic polymerization of cyclic siloxanes of the general formula —[Si($R^{10}$)$_2$—O]$_r$—, where subscript r is 3 to 7. Cyclic siloxanes where subscript r is 3 or 4, and $R^{10}$ is methyl are preferred. Anionic polymerization of hexamethylcyclotrisiloxane monomer is generally described in: Y. Yamashita et al. (e.g., in Polymer J., 14, 913 (1982); ACS Polymer Preprints, 25 (1), 245 (1984); Makromol. Chem., 185, 9 (1984)).

Additionally, each of such blocks C may have a number average molecular weight in a range from about 1,000 to 200,000 and may have a glass transition temperature, $T_g$, of ≤25° C. (in some embodiments, ≤0° C.). The soft "C" block is generally present in a range from 10 to 70 (in some embodiments, 10 to 40, or even 20 to 35) weight percent of the copolymer.

The combined B and C blocks are present in a range from 65 to 95 (in some embodiments, in a range from 70 to 90, or even 70 to 85) weight percent, of the total triblock polymeric units. In some embodiments, the weight ratio of the B block to the C block is about 2:1+/−20%.

The A blocks comprise a copolymer block immiscible in the B and C blocks. The immiscible component of the copolymer shows multiple amorphous phases as determined, for example, by the presence of multiple amorphous glass transition temperatures using differential scanning calorimetry or dynamic mechanical analysis. As used herein, "immiscibility" refers to polymer components with limited solubility and non-zero interfacial tension, that is, a blend whose free energy of mixing is greater than zero:

$$\Delta G \approx \Delta H_m > 0.$$

Miscibility of polymers is determined by both thermodynamic and kinetic considerations. Common miscibility predictors for non-polar polymers are differences in solubility parameters or Flory-Huggins interaction parameters. For polymers with non-specific interactions (e.g., polyolefins), the Flory-Huggins interaction parameter can be calculated by multiplying the square of the solubility parameter difference with the factor (V/RT), where V is the molar volume of the amorphous phase of the repeated unit, R is the gas constant, and T is the absolute temperature. As a result, the Flory-Huggins interaction parameter between two non-polar polymers is always a positive number.

The A blocks are derived from ring-opening anionic polymerization of cyclic monomers or dimers selected from oxiranes (epoxides) to produce polyethers, cyclic sulfides to produce polythioethers, lactones and lactides to produce polyesters, cyclic carbonates to produce polycarbonates, lactams to produce polyamides and aziridines to produce polyamines. Polycarbonates may also be prepared by metal-catalyzed polymerization of carbon dioxide with epoxides listed previously (as described in Journal of the American Chemical Society, 2005, p. 10869). The A blocks may have a linear or branched structure.

Useful epoxides include $C_2$-$C_{10}$ (in some embodiments, $C_2$-$C_4$) alkyl epoxides as well as $C_2$-$C_{10}$ (in some embodiments, $C_3$-$C_6$) glycidyl ethers. In particular, methylglycidylether, ethylglycidylether, allylglycidylether, ethylethoxyglycidyl ether, ethylene, propylene, and butylene oxides. Another useful epoxide is glycidol, which can provide branched A blocks.

Suitable lactones and lactams are those having 3 to 12 carbon atoms in the main ring and are of the general formula:

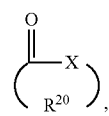

wherein
$R^{20}$ is an alkylene moiety that may be linear or branched having 1 to 20 carbon atoms, preferably 1 to 12 carbon atoms optionally substituted by catenary (in-chain) oxygen atoms, carbonyls or carboxylates; and X is —O— or $NR^1$—, where $R^1$ is $C_1$-$C_4$ alkyl. It will be appreciated that the cyclic lactones are derived from hydroxy acids including 3-hydroxybutyrate, 4-hydroxybutyrate, 3-hydroxyvalerate, lactic acid, 3-hydroxypropanoate, 4-hydropentanoate, 3-hydroxypentanoate, 3-hydroxyhexanoate, 3-hydroxyheptanoate, 3-hydroxyoctanoate, dioxanone, valerolactone, caprolactone, and glycolic acid. The lactams are derived from the corresponding aminoacids. Dimers of the hydroxy acids (e.g., lactide) may be used.

Useful lactams include 2-pyrrolidone, 2-piperidone, caprolactam, lauryllactam and mixtures thereof.

Useful cyclic carbonates include 5-membered to 7-membered cyclic carbonates. In some embodiments, cyclic components comprise trimethylene carbonate, neopentyl glycol carbonate, 2,2,4-trimethyl l-1,3-pentanediol carbonate, 2,2-dimethyl-1,3-butanediol carbonate, 1,3-butanediol carbonate, 2-methyl-1,3-propanediol carbonate, 2,4-pentanediol carbonate, 2-methyl-butane-1,3-diol carbonate, ethylene carbonate, and propylene carbonate.

Suitable cyclic anhydrides include, but are not limited to, aliphatic dicarboxylic anhydrides (e.g., succinic anhydride, glutaric anhydride, maleic anhydride, and combinations thereof).

Example of aziridine monomers comprise aziridine and its alkyl-substituted homologues.

Suitable cyclic ethers include 5-membered to 7-membered cyclic ethers. Reference to suitable ring-opening polymerizable monomers may be found in Frisch, Kurt Charles; Reegan, Sidney L; Ring-opening Polymerization: Kinetics and Mechanisms of Polymerization, Dekker Publishing, NY; 1969 and in Su, Wei-Fang, Ring-Opening Polymerization in Principles of Polymer Design and Synthesis; Springer Berlin Heidelberg, pp. 267-299, 2013.

Generally, the A blocks can be present in a range from 5 to 30 (in some embodiments, 10 to 25) wt. %, of the total weight of the triblock copolymer.

Anionic polymerizations and copolymerizations include at least one polymerization initiator. Initiators compatible with the monomers of the instant copolymers are summarized in Hsieh et al., Anionic Polymerization: Principles and Practical Applications, Ch. 5 and 23 (Marcel Dekker, New York, 1996). The initiator can be used in the polymerization mixture (including monomers and solvent) in an amount calculated on the basis of one initiator molecule per desired polymer chain. The lithium initiator process is well known and is described in, for example, U.S. Pat. No. 4,039,593 (Kamienski, et al.) and U.S. Pat. Re. No. 27,145 (Jones).

Suitable initiators include alkali metal hydrocarbons (e.g., as alkyl or aryl lithium, sodium, or potassium compounds) containing up to 20 carbon atoms in the alkyl or aryl radical or more; preferably up to 8 carbon atoms. Examples of such compounds are benzylsodium, ethylsodium, propylsodium, phenylsodium, butylpotassium, octylpotassium, benzylpotassium, benzyllithium, methyllithium, ethyllithium, n-butyllithium, sec-butyllithium, tert-butyllithium, phenyllithium, and 2-ethylhexyllithium. Lithium compounds are preferred as initiators.

Molecular weight is determined by the initiator/monomer ratio, and thus the amount of initiator may vary from about 0.0001 to about 0.2 mole of organometallic initiator per mole of monomer. Preferably, the amount will be from about 0.0005 to about 0.04 mole of initiator per mole of monomer. For the initiation of carbon-centered anionic polymerization, an inert, preferably nonpolar, organic solvent can be utilized. Anionic polymerization of cyclic monomers that yield an oxygen-centered anion and lithium cation require either a strong polar solvent such as tetrahydrofuran, dimethyl sulfoxide, or hexamethylphosphorous triamide, or a mixture of such polar solvent with nonpolar aliphatic, cycloaliphatic, or aromatic hydrocarbon solvent such as hexane, heptane, octane, cyclohexane, or toluene.

Generally, the polymerization can be carried out at a temperature in a range from about −78° C. to about 100° C. (in some embodiments, in a range from about 0° C. to about 60° C.). Anhydrous conditions and an inert atmosphere such as nitrogen, helium, or argon are typically required.

Termination of the anionic polymerization is, in general, achieved via direct reaction of the living polymeric anion with protic solvents. Termination with halogen-containing terminating agents (i.e., functionalized chlorosilanes) can produce, for example, vinyl-terminated polymeric monomers. Such terminating agents may be represented by the general formula $X-(Y)_n-Si(R)_{3-m}Cl_m$, where m is 1, 2, or 3 and where X, Y, n, and R have been previously defined.

Preferred terminating agents are chlorotrimethylsilane or methacryloxypropyldimethylchlorosilane. The termination reaction is carried out by adding a slight molar excess of the terminating agent (relative to the amount of initiator) to the living polymer at the polymerization temperature.

It is recognized that transitioning from a carbon-centered propagating anion to an oxygen-centered propagating anion can be used as a method for terminating an anionic polymerization of vinyl aromatics or conjugated dienes. For example, addition of oxiranes like ethylene oxide to the styrenic anion produced during styrene polymerization can lead to end-capping of the polymer chain with a hydroxyl, oxygen-centered anionic functionality. The reduced nucleophilicity of the oxygen-centered anion prevents further polymerization of any vinyl aromatic or conjugated diene present, thus ethylene oxide acts as a terminating agent in one sense, yet also forms an initiator for further ring-opening polymerizations (as in Hsieh et al., Anionic Polymerization: Principles and Practical Applications, Ch. 5 and 23 (Marcel Dekker, New York, 1996)).

When using alkyl lithium initiators, this disclosure provides a method of preparing the triblock copolymers comprising the steps of (a) anionically polymerizing the C block monomer, (b) polymerizing the B block monomer, (c) end capping with ethylene oxide, (d) fully or partially hydrogenating the CB-OH block copolymer, and (e) further polymerizing the copolymer of step (d) with a ring-opening polymerizable A monomer. The method may be illustrated as follows where R is the residue of the initiator and B* and C* represent the hydrogenated B and C blocks respectively.

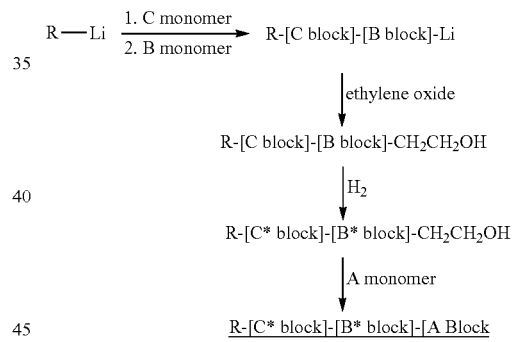

Functional anionic initiators can also be used to provide end-functionalized polymers. These initiators are typically suitable for initiating the recited monomers using techniques known to those skilled in the art. Various functional groups can be incorporated onto the end of a polymer chain using this strategy including: alcohol(s), thiol(s), carboxylic acid, and amine(s). In each of these cases, the initiator must contain protected functional groups that can be removed using post polymerization techniques. Suitable functional initiators are known in the art and are described in, for example, U.S. Pat. No. 6,197,891 (Schwindeman et al.), U.S. Pat. No. 6,160,054 (Periera et al.), U.S. Pat. No. 6,221,991 (Letchford et al.), U.S. Pat. No. 6,184,338 (Schwindeman et al.), and U.S. Pat. No. 5,321,148 (Schwindeman et al.), the disclosures of which are incorporated herein by reference thereto.

These initiators contain tertiary alkyl or trialkylsilyl protecting groups that can be removed by post-polymerization deprotection. Tert-alkyl-protected groups can also be removed by reaction of the polymer with para-toluenesulfonic acid, trifluoroacetic acid, or trimethylsilyliodide to produce alcohol, amino, or thiol functionalities. Additional methods of deprotection of the tert-alkyl protecting groups can be found in T. W. Greene and P. G. M. Wuts, Protective Groups in Organic Synthesis, Second Edition, Wiley, New York, 1991, page 41. Tert-butyldimethylsilyl protecting groups can be removed by treatment of the polymer with acid, such as hydrochloric acid, acetic acid, or para-toluenesulfonic acid. Alternatively, a source of fluoride ions, for instance tetra-n-butylammonium fluoride, potassium fluoride and 18-crown-6, or pyridine-hydrofluoric acid complex, can be employed for deprotection of the tert-butyldimethylsilyl protecting groups. Additional methods of deprotection of the tert-butyldimethylsilyl protecting groups can be found in T. W. Greene and P. G. M. Wuts, Protective Groups in Organic Synthesis, Second Edition, Wiley, New York, 1991, pp. 80-83.

When using a functional initiator, this disclosure provides a method of preparing the triblock copolymer comprising the steps of (a) anionically polymerizing the B block monomer using a functionalized initiator, (b) polymerizing the C block monomer, (c) terminating the polymerization, (d) hydrogenating the CB-OR block copolymer, and e) deprotecting and further polymerizing the copolymer of step (d) with a ring-opening polymerizable A monomer.

This method may be illustrated as follows:

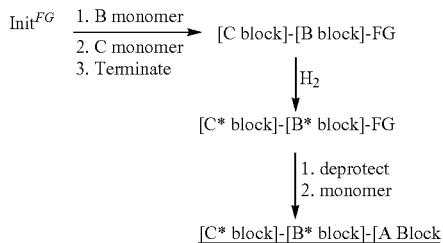

After preparation of the block copolymer, the copolymer is fully or partially hydrogenated to remove sites of unsaturation in both the conjugated diene polymer C block and the vinyl aromatic polymer B block segments of the copolymer. Any method of hydrogenation can be used and such methods typically include the use of metal catalysts supported on an inorganic substrate, such as Pd on BaSO4 (U.S. Pat. No. 5,352,744 (Bates et al.)) and Ni on kieselguhr (U.S. Pat. No. 3,333,024 (Haefele et al.)), both of which are incorporated herein by reference. Additionally, soluble, homogeneous catalysts such as those prepared from combinations of transition metal salts of 2-ethylhexanoic acid and alkyl lithiums can be used to fully saturate block copolymers, as described in *Die Makromolekulare Chemie*, Volume 160, pp. 291, 1972.

The copolymer hydrogenation can also be achieved using hydrogen and a heterogeneous catalyst such as those described in U.S. Pat. No. 5,352,744 (Bates et al.), U.S. Pat. No. 5,612,422 (Hucul et al.), and U.S. Pat. No. 5,645,253 (Hoshino) which are herein incorporated by reference. The catalysts described therein are heterogeneous catalysts consisting of a metal crystallite supported on a porous silica substrate. An example of a silica supported catalyst which is especially useful in the polymer hydrogenation is a silica which has a surface area of at least 10 $m^2/g$ which is synthesized such that is contains pores with diameters in a range from 3000 to 6000 angstroms. This silica is then impregnated with a metal capable of catalyzing hydrogenation of the polymer, such as nickel, cobalt, rhodium, ruthenium, palladium, platinum, other Group VIII metals, combinations or alloys thereof. Other heterogeneous catalysts can also be used, having average pore diameters in the range of 500 to 3,000 angstroms.

The catalyst may comprise a support on which the catalyst components are deposited. In one embodiment, the metals are deposited on a support (e.g., a silica, alumina or carbon). In a more specific embodiment, a silica support having a narrow pore size distribution and surface area greater than 10 meters squared per gram ($m^2/g$) is used. The pore size distribution, pore volume, and average pore diameter of the support can be obtained via mercury porosimetry following the proceedings of ASTM D-4284-83. Methods of hydrogenating aromatic polymers with so-called "wide pore silica catalysts" are described in U.S. Pat. No. 5,700,878 (Hahn et al.), the disclosure of which is incorporated herein by reference.

The hydrogenation reaction can be conducted in the absence of a solvent but is preferably conducted in a hydrocarbon solvent in which the polymer is soluble and which will not hinder the hydrogenation reaction. Preferably the solvent is a saturated solvent such as cyclohexane, methylcyclohexane, ethylcyclohexane, cyclooctane, cycloheptane, dodecane, dioxane, diethylene glycol dimethyl ether, tetrahydrofuran, isopentane, decahydronaphthalene or mixtures thereof, with cyclohexane being the most preferred.

The temperature at which the hydrogenation is conducted can be any temperature at which hydrogenation occurs without significant degradation of the polymer. Degradation of the polymer after hydrogenation can be detected by a decrease in $M_n$, an increase in polydispersity or a decrease in glass transition temperature. Typical hydrogenation temperatures are from about 40° C. (in some embodiments, from about 100° C., about 110° C., or even from about 120° C. to about 250° C.; in some embodiments, in a range from about 200° C., to about 180° C., or even to about 170° C.).

The pressure of the hydrogenation reaction is not critical, though hydrogenation rates increase with increasing pressure. Typical pressures range from atmospheric pressure to 70 MPa (in some embodiments, in a range from 0.7 to 10.3 MPa). The hydrogenation reaction vessel is purged with an inert gas to remove oxygen from the reaction area. Inert gases include but are not limited to nitrogen, helium, and argon, with nitrogen being preferred.

The total number average molecular weight (MO of the hydrogenated BC block copolymers of the present disclosure is typically from 24,000 g/mol (in some embodiments, from 30,000 g/mol, from 40,000 g/mol, or even in a range from 50,000 g/mol to 150,000 g/mol; in some embodiments, to 135,000 g/mol, to 100,000 g/mol, to 90,000 g/mol, to 80,000 g/mol, or even to 75,000 g/mol). The $M_n$ is determined by gel permeation chromatography. The molecular weight of the hydrogenated block copolymer and properties obtained are dependent upon the molecular weight of each of the hydrogenated polymeric blocks.

The degree of hydrogenation of the block copolymer or any portion thereof can also be described. Alternatively, the residual unsaturation can be described. Both the degree of hydrogenation and the residual unsaturation are bulk measurements based on the entire polymer population. Due to the heterogeneous nature of the hydrogenation, there will be a distribution of residual unsaturation from chain to chain.

The degree of hydrogenation is generally measured as a function of the conversion of poly(vinyl aromatic) blocks to poly(cyclohexyl) blocks. Generally greater than 45 mole percent (mol %) of the vinyl aromatic block is hydrogenated (which equates to a 55 mol % residual unsaturation) (in some embodiments, greater than 60 mol % is hydrogenated (equating to a 40 mol % residual unsaturation), or even greater than 90 mol % is hydrogenated (equating to a 10 mol % residual unsaturation)) as measured by proton nuclear magnetic resonance (NMR) spectroscopy.

As the conjugated diene C blocks are more readily hydrogenated than the vinyl aromatic B blocks, the conversion of the C blocks will be higher. In some embodiments hydrogenation of the BC block copolymer will yield greater than 45 percent conversion of the vinyl aromatic polymer block segments and greater than 60 percent conversion of the diene polymer block segments. In some embodiments hydrogenation of the BC block copolymer will yield greater than 60 percent of the vinyl aromatic polymer block segments and greater than 75 percent of the diene polymer block segments. In some embodiments, hydrogenation of the BC block copolymer will yield greater than 90 percent of the vinyl aromatic polymer block segments, and greater than 99 percent of the diene polymer. The term 'degree of hydrogenation' refers to the percentage of the original unsaturated bonds which become saturated upon hydrogenation. The degree of hydrogenation for the blocks may be determined by ultraviolet-visible (UV-VIS) spectrophotometry or by proton NMR.

It will be understood that if the C blocks are chosen from silicon polymers, the BC blocks are subject to the hydrogenation process, but the silicon polymer C blocks are not hydrogenated (i.e., are not reduced as there are no carbon-carbon double bonds to saturate).

Thus, vinyl aromatic units, such as styrene units can be converted to cyclohexyl monomer units, and produce a block copolymer having of a $T_g$ of up to 145° C., depending of the degree of hydrogenation. The hydrogenated block copolymers may be described as having high $T_g$ poly(cyclohexylethyl) B blocks having a $T_g$ of at least 110° C. (in some embodiments, at least 115° C., or even at least 130° C.), and a low $T_g$ "C" block having a $T_g \leq 25°$ C., exemplified by poly(ethylene-alt-propylene), poly(ethylene), poly(ethylene-co-butylene), or poly(butylene). The combined B and C blocks comprise 70 to 95 weight percent of the triblock polymeric units. Generally, the B blocks of the BC portion of the copolymer comprise between about 55 and about 75 weight percent of the BC block (in some embodiments, about 40 to 70 wt. %). The soft "C" block comprises a total of 10 to 40 weight percent of the triblock polymer and the glassy B block comprises 35 to 65 weight percent of the triblock copolymer.

With each of the synthetic schemes it will be understood that some amount of A, B, C, or BC (co)polymers will also be present in the isolated (co)polymer blend. Generally greater than 50 weight percent of the resulting blend will be the triblock copolymer, as determined by gel permeation chromatography (GPC) and/or NMR.

Disclosed triblock copolymers can also be used to prepare porous membranes. Porous membranes can be prepared using solvent induced phase separation (SIPS) or vapor induced phase separation (VIPS) methods.

Methods that utilize SIPS can include steps of dissolving the triblock copolymer in a solvent system to form a triblock copolymer solution or obtaining the triblock copolymer solution; forming a precursor article from the triblock copolymer solution; removing at least a portion of the solvent system to form a partially dried precursor article; and contacting the partially dried precursor article with a non-solvent to form a porous membrane including the triblock copolymer. Various process parameters related to the above steps can be utilized to obtain the desired properties of the membrane.

The step of forming a triblock copolymer solution includes dissolving the triblock copolymer solution in a solvent system. The solvent system can be a binary system, or even a ternary system. The solvent system can generally be described as a good solvent for the triblock copolymer. Illustrative solvent systems can include, for example, dimethylformamide (DMF), dimethylacetamide (DMAc), 1,4-dioxane, diglyme, tetrahydrofuran (THF), N-methylpyrrolidone (NMP), or combinations thereof. The amounts of individual solvents, the identities of the individual solvents, or both can be varied to provide desired properties in membranes. In some specific, illustrative embodiments, useful solvent systems can include THF and NMP, for example. In some specific illustrative embodiments, useful solvent systems can include in a range from 20 to 80 weight percent THF, based on the total weight of the solvent system, with the balance being NMP, for example.

The amount of the triblock copolymer in the triblock copolymer solution can also be varied to provide desired properties. Generally, useful triblock copolymer solutions can include not less than 5 (in some embodiments, not less than 8, or even not less than 9) weight percent triblock copolymer. Generally, useful triblock copolymer solutions can include not greater than 20 (in some embodiments, not greater than 18, or even not greater than 15) weight percent triblock copolymer.

The step of forming a precursor article can be accomplished using many different processes. Illustrative precursor articles can include films, flat sheets, hollow fibers/capillaries, and tubes.

Film type precursor articles can be formed using any known methods of forming a film or layer from a liquid. Illustrative methods include casting the triblock copolymer solution into a film (e.g., on a substrate of some kind such as a roll or flat substrate or forming a free-standing film, for example, on a temperature-controlled roller) using a notch bar coater, knife coater, for example; spin coating the solution into a film (e.g., on a substrate of some kind) using a spin coater. Film type precursor articles can be described by the thickness thereof, for example. Film type precursors made using a notch bar coater can be formed using a height of the notch bar in a range from 1 to 15 mil micrometers (in some embodiments, in a range from 25 to 375 micrometers).

Once the precursor article has been formed, the next step is to remove at least a portion of the solvent system to form a partially dried precursor article. The removed portion of the solvent system can be removed by allowing some portion thereof to evaporate (which may remove more of one solvent than the other(s)) under room temperature conditions, elevated temperature conditions, elevated air flow conditions, decreased pressure conditions, or any combination thereof, for example. In some illustrative embodiments, the solvent system can be allowed to evaporate for not greater than a minute (in some embodiments, not greater than 45 seconds, 40 seconds, 35 seconds, 30 seconds, 25 seconds, or even not greater than 20 seconds). The removed portion of the solvent system can also be removed by contacting the surface of the precursor article with a liquid in which the removed portion of the solvent system is soluble and then removing that secondary liquid (made up of the liquid and a portion of the solvent system) from the surface of the precursor article. The amount of the solvent system removed, the relative amounts of the solvent(s) in the solvent system removed, or a combination thereof can be varied to provide desired properties.

After a partially dried precursor article has been formed, the next step includes contacting the partially dried precursor article with a nonsolvent. A nonsolvent can also include more than one solvent, as such a nonsolvent refers to a solvent system or a single solvent. A nonsolvent is one in which the triblock copolymer is substantially insolvent and induces phase separation of the polymer and solvent. The solvent(s) is (are) at least partially soluble and up to fully miscible in the non-solvent(s). Illustrative nonsolvents can include, for example, water, alcohols (e.g., methanol, ethanol or isopropanol), DPM glycol ether (available, for example, under the trade designation "DOWANOL" from the Dow Chemical Company, Midland, Mich.), and pentanes. The choice of the nonsolvent, the concentration of solvent in the nonsolvent bath, additives such as salts in the nonsolvent bath, the time the partially dried precursor is in the nonsolvent, the temperature of the nonsolvent, or combinations thereof can be varied to provide desired properties.

In some embodiments the membrane is free-standing, whereas in alternate embodiments the membrane is disposed on a substrate. Suitable substrates include, for example, and without limitation, polymeric membranes, nonwoven substrates, porous ceramic substrates, and porous metal substrates. Optionally, the membrane comprises a hollow fiber membrane. The membrane may have a hollow shape, the fibers themselves may be hollow, or both. In certain embodiments, the hollow fiber membrane can be disposed on a substrate that has a hollow shape. The membrane may be either symmetric or asymmetric, for instance depending on a desired application. In addition, the smallest pores can be located at one surface, the other surface, both surfaces, or at any point through the thickness of the membrane.

Disclosed porous membranes can have dry thicknesses from in a range from 0.5 to 500 micrometers, for example. Illustrative freestanding membranes can have dry thicknesses in a range from 25 micrometers to 150 micrometers. Illustrative membranes cast onto a support can have dry thicknesses in a range from 0.5 micrometers to 150 micrometers.

Porous membranes disclosed herein can be utilized in numerous and varied applications. In some illustrative embodiments, porous membranes can be utilized as a filter or part of a filter. Illustrative filters can be configured to be coupled with an element that supports the filter, a filter support. A filter support can function to maintain the filter in operable communication with a receptacle. Illustrative types of filter supports can offer support across substantially the entire surface area of the filter or less than the entire surface area of the filter. The combination of the filter, the receptacle and the filter support can be referred to herein as a filter assembly. In an embodiment with a disposable liner and a container that holds the disposable liner, the combination of the filter, the container, the liner and the filter support can be referred to as a filter assembly. Further details regarding filters, filter supports, and filter assemblies as well as additional articles can be found in commonly assigned PCT Pat. Pub. No. WO2010/078404 (Kshirsagar et al.), the disclosure of which is incorporated herein by reference.

A receptacle can be configured to be operably coupled with a filter. In an embodiment, the receptacle can contain or can be configured to be coupled with an element that supports a filter. Illustrative receptacles can be found, for example, in U.S. Pat. No. 8,685,746 (Halverson et al.), PCT Pub. No. WO2009/067503 (Halverson et al.), PCT Pub. No. WO2007/137257 (Halverson et al.), U.S. Pat. No. 8,569,072 (Halverson et al.), and PCT Pub. No. WO2008/150779 (Ribeiro et al.), the disclosures of which are incorporated herein by reference.

Also disclosed herein are kits. Illustrative kits can include a device for contacting a fluid sample with a filter containing a disclosed porous membrane, and a receptacle. Kits can include one or a plurality of filters, one or a plurality of receptacles, or both. The device can include a sample container, a filter holder, a filter containing a disclosed porous membrane, and an optional first adaptor. The first adaptor can be configured to interface the filter holder with the receptacle.

Often, a second adaptor can be provided and configured to attach the filter holder to a vacuum source or to a collection container. In certain embodiments, the device further includes a rotary pump attached to the filter holder or to the second adaptor. In some embodiments of the kit, the receptacle can optionally contain at least one reagent, although in alternate embodiments, at least one reagent can be added to the receptacle at the time of use of the kit. Typically, the receptacle can be configured to be operationally connected to a detection instrument, such as a luminometer. Kits can also include other optional components. In some embodiments, a kit can include components that can be utilized to detect microorganisms. If desired, one or more additives (e.g., lysis reagents, bioluminescence assay reagents, nucleic acid capture reagents (e.g., magnetic beads), microbial growth media, buffers (e.g., to moisten a solid sample), microbial staining reagents, washing buffers (e.g., to wash away unbound material), elution agents (e.g., serum albumin), surfactants (available, for example, under the trade designation "TRITON" X-100," a nonionic surfactant from Union Carbide Chemicals and Plastics, Houston, Tex.), mechanical abrasion/elution agents (e.g., glass beads), and the like) can be included in a kit as disclosed herein.

In many embodiments, illustrative kits can further include instructions for using the kit. Such instructions typically include method details including some of those described above. Some illustrative kits can include a filter, which can include or be a disclosed porous membrane and a package for containing the filter. Some illustrative kits can include a filter, which can include or be a disclosed porous membrane, a package for containing the filter, and instructions for using the filter.

Illustrative Embodiments

With various aspects of the compositions, articles and methods being described, various illustrative combinations are also described to further illustrate various combinations that are useful in certain applications, some of which are described herein. As used herein, "any one of the X embodiments is included" refers to including any one of the embodiments including the designation X (e.g., any one of the A embodiments refers to embodiments A, A1, A2, A5a, etc., and any one of the A5 embodiments refers to embodiments A5, A5a, A5b, etc.).

In illustrative embodiment A, a porous membrane includes a triblock copolymer of the formula ABC. B is a hydrogenated vinyl aromatic block present in a range from 30 to 90 weight percent, based on the total weight of the copolymer and has a $T_g$ of $\geq 110°$ C. C is a rubbery block present in a range from 10 to 70 weight percent, based on the total weight of the copolymer and has a $T_g \leq 25°$ C. A is substantially incompatible with both the B and C blocks and is derived from ring-opening polymerization. B+C is present in a range from 70 to 95 weight percent, based on the total weight of the copolymer.

In illustrative embodiment B, a shaped article includes a porous membrane that includes a triblock copolymer of the formula ABC. B is a hydrogenated vinyl aromatic block present in a range from 30 to 90 weight percent, based on the total weight of the copolymer and has a $T_g$ of $\geq 110°$ C. C is a rubbery block present in a range from 10 to 70 weight percent, based on the total weight of the copolymer and has a $T_g \leq 25°$ C. A is substantially incompatible with both the B and C blocks and is derived from ring-opening polymerization. B+C is present in a range from 70 to 95 weight percent, based on the total weight of the copolymer.

In illustrative embodiment C, a filter includes a porous membrane that includes a triblock copolymer of the formula ABC. B is a hydrogenated vinyl aromatic block present in a range from 30 to 90 weight percent, based on the total weight of the copolymer and has a $T_g$ of $\geq 110°$ C. C is a rubbery block present in a range from 10 to 70 weight percent, based on the total weight of the copolymer and has a $T_g \leq 25°$ C. A is substantially incompatible with both the B and C blocks and is derived from ring-opening polymerization. B+C is present in a range from 70 to 95 weight percent, based on the total weight of the copolymer.

In illustrative embodiment D, a kit includes a filter including a porous membrane that includes a triblock copolymer of the formula ABC. B is a hydrogenated vinyl aromatic block present in a range from 30 to 90 weight percent, based on the total weight of the copolymer and has a $T_g$ of $\geq 110°$ C. C is a rubbery block present in a range from 10 to 70 weight percent, based on the total weight of the copolymer and has a $T_g \leq 25°$ C. A is substantially incompatible with both the B and C blocks and is derived from ring-opening polymerization. B+C is present in a range from 70 to 95 weight percent, based on the total weight of the copolymer. The kit also includes a package for containing the filter.

In illustrative embodiment E, a method of preparing a porous membrane. The method includes dissolving a triblock copolymer of the formula ABC in a solvent system to form a triblock copolymer solution. B is a hydrogenated vinyl aromatic block present in a range from 30 to 90 weight percent, based on the total weight of the copolymer and has a $T_g$ of $\geq 110°$ C. C is a rubbery block present in a range from 10 to 70 weight percent, based on the total weight of the copolymer and has a $T_g \leq 25°$ C. A is substantially incompatible with both the B and C blocks and is derived from ring-opening polymerization. B+C is present in a range from 70 to 95 weight percent, based on the total weight of the copolymer. The method also includes forming a precursor article from the triblock copolymer solution, removing at least a portion of the solvent system from the precursor article to form a partially dried precursor article; and contacting the partially dried precursor article with a nonsolvent, thereby forming the porous membrane.

In illustrative embodiment A1, the article or method of any one of the A, B, C, D, or E embodiments is included, wherein the porous membrane is an integral asymmetric membrane.

In illustrative embodiment A2, the article or method of any one of the A, B, C, D, or E embodiments is included, wherein the B block has a residual unsaturation of not greater than 55 mol %.

In illustrative embodiment A3, the article or method of any one of the A, B, C, D, or E embodiments is included, wherein the B block has a residual unsaturation of not greater than 50 mol %.

In illustrative embodiment A4, the article or method of any one of the A, B, C, D, or E embodiments is included, wherein the B block has a residual unsaturation of not greater than 10 mol %.

In illustrative embodiment A5, the article or method of any one of the A, B, C, D, or E embodiments is included, wherein A is present in a range from 5 to 30 weight percent, based on the total weight of the copolymer.

In illustrative embodiment A6, the article or method of any one of the A, B, C, D, or E embodiments is included, wherein A is present in a range from 10 to 25 weight percent, based on the total weight of the copolymer.

In illustrative embodiment A7, the article or method of any one of the A, B, C, D, or E embodiments is included, wherein the B block is present in a range from 60 weight percent to 90 weight percent, based on the total weight of the copolymer.

In illustrative embodiment A8, the article or method of any one of the A, B, C, D, or E embodiments is included, wherein the C block is present in a range from 10 weight percent to 40 weight percent, based on the total weight of the copolymer.

In illustrative embodiment A9, the article or method of any one of the A, B, C, D, or E embodiments is included, wherein the B block is selected from at least partially hydrogenated styrene, α-methylstyrene, 4-methylstyrene, 3-methylstyrene, 4-ethylstyrene, 3,4-dimethylstyrene, 2,4,6-trimethylstyrene, 3-tert-butyl-styrene, 4-tert-butylstyrene, 4-methoxystyrene, 4-trimethylsilylstyrene, 2,6-dichlorostyrene, vinyl naphthalene, 4-chlorostyrene, 3-chlorostyrene, 4-fluorostyrene, 4-bromostyrene, vinyl toluene, ethylstyrene, diethyl styrene, di-n-butylstyrene, isopropylstyrene, other alkylated-styrenes, styrene analogs, vinyl naphthalene, and vinyl anthracene.

In illustrative embodiment A10, the article or method of any one of the A, B, C, D, or E embodiments is included, wherein the C block is selected from hydrogenated butadiene, isoprene, ethylbutadiene, phenylbutadiene, piperylene, pentadiene, hexadiene, ethylhexadiene, and dimethylbutadiene 1,3-cyclodiene monomers (e.g., 1,3-cyclohexadiene, 1,3-cycloheptadiene and 1,3-cyclooctadiene, preferably 1,3-cyclohexadiene, and copolymers thereof).

In illustrative embodiment A11, the article or method of any one of the A, B, C, D, or E embodiments is included, wherein C is a organopolysiloxanes having recurring units of —[Si(R$^{10}$)$_2$—O]— wherein each R$^{10}$ denotes an organic radical (e.g., alkyl, cycloalkyl or aryl).

In illustrative embodiment A12, the article or method of any one of the A, B, C, D, or E embodiments is included, wherein A is derived from ring-opening anionic polymerization of cyclic monomers selected from oxiranes (epoxides), cyclic sulfides, lactones, lactides, cyclic carbonates, lactams and aziridines.

In illustrative embodiment A13, the article or method of any one of the A, B, C, D, or E embodiments is included, wherein the A block comprises polyesters selected from poly(lactic acid), poly(glycolic acid), poly(lactic-co-glycolic acid), polybutylene succinate, polyhydroxybutyrate, polyhydroxyvalerate, derived from ring opening polymerization of lactones.

In illustrative embodiment A14, the article or method of any one of the A, B, C, D, or E embodiments is included, wherein the A block is a polyether selected from poly (ethylene oxide), poly(propylene oxide), poly(ethoxyethylglycidylether), poly(vinylglycidylether), poly(methylglycidylether), poly(ethylglycidylether), poly(propylglycidylether), poly(butylglycidylether), glycidol, and copolymers thereof derived from ring-opening polymerization of cyclic ethers.

In illustrative embodiment A15, the article or method of any one of the A, B, C, D, or E embodiments is included, wherein A is derived from alternating copolymerization of carbon dioxide and oxiranes.

In illustrative embodiment A16, the article or method of any one of the A, B, C, D, or E embodiments is included, wherein the $M_n$ is >60 kDa.

In illustrative embodiment A17, the article or method of any one of the A, B, C, D, or E embodiments is included, wherein the $M_n$ is 60-500 kDa.

In illustrative embodiment A18, the article or method of any one of the A, B, C, D, or E embodiments is included, wherein the porous membrane has a dry thickness from 0.5 to 500 micrometers.

In illustrative embodiment A19, the article or method of any one of the A, B, C, D, or E embodiments is included, wherein the porous membrane is a freestanding membrane and has a dry thickness in a range from 25 to 150 micrometers.

In illustrative embodiment A20, the article or method of any one of the A, B, C, D, or E embodiments is included, wherein the porous membrane is on a support and has a dry thickness from 0.5 micrometer to 150 micrometers.

In illustrative embodiment B1, the article of the B embodiment is included, wherein the article is a freestanding flat sheet, a supported flat sheet, or a hollow fiber.

In illustrative embodiment D1, the kit of the D embodiment is included, wherein the package comprises information related to the filter or a use thereof.

In illustrative embodiment D2, the kit of the D embodiment is included, further including a filter support.

In illustrative embodiment D3, the kit of the D embodiment is included, further including a receptacle.

In illustrative embodiment E1, the method of the E embodiment is included, wherein the triblock copolymer solution has triblock copolymer in a range from 9 to 15 (in some embodiments, in a range from 8 to 18, or even 5 to 20) weight percent based on the total weight of the triblock copolymer solution.

In illustrative embodiment E2, the method of the E embodiment is included, wherein the film is formed by casting the triblock copolymer solution on a substrate or a temperature controlled roll.

In illustrative embodiment E3, the method of the E embodiment, wherein the film is formed using a notch bar coater, knife coater, or a spin coater.

In illustrative embodiment E4, the method of the E embodiment is included, wherein the triblock copolymer solution is cast onto a substrate using a notch bar coater having a coating gap of 10 mils (in some embodiments, in a range from 1 to 15) mils (25 to 375 micrometers)).

In illustrative embodiment E5, the method of the E embodiment is included, wherein the triblock copolymer solution is cast onto a substrate at a thickness in a range from 25 to 375 micrometers.

In illustrative embodiment E6, the method of the E embodiment is included, wherein the portion of the solvent system is removed by evaporation.

In illustrative embodiment E7, the method of the E embodiment is included, wherein portion of the solvent system is removed by allowing the solvent system to evaporate for not greater than 40 (in some embodiments 45, 35, 30, 25, or even 20) seconds.

Examples

The following Examples are merely for illustrative purposes and are not meant to be overly limiting on the scope of the appended claims. Notwithstanding that the numerical ranges and parameters setting forth the broad scope of the present disclosure are approximations, the numerical values set forth in the specific examples are reported as precisely as possible. Any numerical value, however, inherently contains certain errors necessarily resulting from the standard deviation found in their respective testing measurements. At the very least, and not as an attempt to limit the application of the doctrine of equivalents to the scope of the claims, each numerical parameter should at least be construed in light of the number of reported significant digits and by applying ordinary rounding techniques.

General Considerations

Polymer synthesis and reagent purifications were conducted in a glovebox (obtained under the trade designation "MBRAUN LABMASTER SP" from MBraun Inc., Stratham, N.H.) or in custom glassware designed to enable anionic polymerizations (e.g., see Ndoni, S.; Papadakis, C. M.; Bates, F. S.; Almdal, K.; Laboratory-scale Setup for Anionic Polymerization under Inert Atmosphere. Review of Scientific Instruments, 1995, 66 (2), pp. 1090-1095, DOI: 10.1063/1.1146052). Standard air-free techniques were used for anionic polymerization and reagent manipulations. Hydrogenations were conducted in a Parr series 4530/40/50 (rated to 1900 pounds per square inch (psi) (13.1 Mpa)) 2 liter (L) stirred reactor with temperature control. Reagents and corresponding suppliers are listed in Table 1, below.

TABLE 1

Materials

| Abbreviation | CAS #/Product Code | Description |
| --- | --- | --- |
| Isoprene | L14619 | Obtained from Alfa Aesar, Ward Hill, MA |
| Styrene | S4972 | Reagent plus, >99%; obtained from Sigma-Aldrich Co. LLC, St. Louis, MO |
| TBDMSPL | — | Tert-butyl-dimethylsiloxy-propyl-1-lithium, 1.04M in cyclohexane; obtained from FMC Lithium, Charlotte, NC |
| Rac-lactide | M700 | Monomer obtained from NatureWorks LLC, Minnetonka, MN |
| Benzene | BX0212-6 | Benzene; obtained under the trade designation "OMNISOLV" from EMD Millipore Corporation, Billerica, MA |

TABLE 1-continued

Materials

| Abbreviation | CAS #/Product Code | Description |
| --- | --- | --- |
| THF | 401757 | Tetrahydrofuran, anhydrous, ≥99.9%, inhibitor-free; obtained from Sigma-Aldrich Co. LLC |
| TBAF | 216143 | Tetrabutylammonium Fluoride, 1.0M in tetra hydrofuran (THF); obtained from Sigma-Aldrich Co. LLC |
| Sec-BuLi | 718-01 | 12 wt. % sec-butyllithium in cyclohexane; obtained from FMC Lithium, Charlotte, NC |
| Dibutyl-magnesium | 345113 | 1.0M di-n-butylmagnesium solution in heptane; obtained from Sigma Aldrich Co. LLC |
| Silica gel | 545524 | Silica gel, 60 Angstrom, 200-425 mesh; obtained from Sigma-Aldrich Co. LLC |
| Methanol | MX0480-6 | Methanol; obtained under the trade designation "OMNISOLV" from EMD Millipore Corporation |
| Pd on $CaCO_3$ | 11723 | Palladium hydrogenation catalyst, 5% by mass on calcium carbonate powder (reduced); obtained from Alfa Aesar |
| Diphenylethylene | A14434 | 1,1-Diphenylethylene, 98%; obtained from Alfa Aesar |
| $CH_2Cl_2$ | DX0831-1 | Dichloromethane; obtained under the trade designation "OMNISOLV" from EMD Millipore Corporation |
| $CaH_2$ | 21170 | Calcium hydride; obtained from Sigma Aldrich Co. LLC |
| Ethyl acetate | EX0241-1 | Ethyl acetate; obtained under the trade designation "OMNISOLV" from EMD Millipore Corporation |
| Isopropanol | BDH1133-4LP | Isopropanol; obtained under the trade designation "BDH" from VWR, Radnor, PA |
| Diatomaceous earth | CX0574 | Diatomaceous earth; obtained under the trade designation "CELITE" from obtained from EMD Millipore Corporation |
| Toluene | 244511 | Toluene, anhydrous: obtained from Sigma Aldrich Co. LLC |
| Sn(II) catalyst | S3252 | Tin(II) ethylhexanoate: obtained from Sigma Aldrich Co. LLC |
| DBU | A12449 | 1,8-Diazabicyclo[5.4.0]undec-7-ene. 99%; obtained from Alfa Aesar |
| DI Water | | Deionized water |
| MilliQ Water | | Water passed through a purification system; obtained under the trade designation "MILLIQ GRADIENT A10 SYSTEM" from EMD Millipore Corporation |
| Tetrahydrofuran (THF) | 109-99-9 | Solvent; obtained under the trade designation "OMNISOLV" from EMD Millipore Corporation |
| NMP | 872-50-4 | N-methyl-2-pyrollidone; obtained from Alfa Aesar |
| Dextran, $M_r$ ~6000 Da | 9004-54-0 | Dextran, obtained from Millipore Sigma, Burlington, MA |
| Dextran, $M_r$ ~40 kDa | 9004-54-0 | Obtained from Millipore Sigma |
| Dextran, $M_r$ ~100 kDa | 9004-54-0 | Obtained from Fluka Analytical, St. Louis, MO |
| Dextran, $M_r$ ~2000 kDa | 9004-54-0 | Obtained from Millipore Sigma |

Reagent Drying

Benzene was degassed by bubbling with argon (Ar) for longer than one hour before being cannula-transferred to a Strauss flask containing degassed 1,1-diphenylethylene. Sec-BuLi was then added under Ar counterflow via syringe, causing a very gradual color change from light yellow to deep, wine red over the course of an hour. After stirring overnight, benzene was vacuum transferred to an addition funnel. $CH_2Cl_2$ was dried over $CaH_2$, degassed with three freeze-pump-thaw cycles, and vacuum-transferred into a receiving flask. Styrene was stirred over $CaH_2$ overnight, degassed with three freeze-pump-thaw cycles, and then vacuum-transferred into a Schlenk bomb containing dried dibutyl-magnesium. After stirring overnight in an Ar atmosphere, styrene was again vacuum-transferred into a receiving flask to afford a final, dry monomer. Isoprene was dried as detailed above with sequential vacuum transfers from $CaH_2$ and dibutyl-magnesium. Lactide was recrystallized from ethyl acetate and dried overnight under high vacuum.

Palladium hydrogenation catalyst (5% on calcium carbonate, reduced) was placed in a Schlenk bomb and exposed to high vacuum at room temperature overnight.

All other chemicals were used as received.

Gel Permeation Chromatography (GPC)

The GPC equipment included a quaternary pump, autosampler, column compartment and diode array detector (obtained under the trade designation "AGILENT 1100" from Agilent Technologies, Santa Clara, Calif.) operated at a flow rate of 1.0 mL/min. The GPC column set (obtained under the trade designation "STYRAGEL HR 5E" (300 mm length×7.8 mm internal diameter) from Waters Corporation, Milford, Mass.) plus a guard column (obtained under the trade designation "STYRAGEL GUARD COLUMN" from Waters Corporation). The detection consisted of a light scattering detector (obtained under the trade designation "DAWN HELEOS II 18 ANGLE LIGHT SCATTERING DETECTOR" from Wyatt Technology Corporation, Santa Barbara, Calif.), and a differential refractive index detector (obtained under the trade designation "OPTILAB T-REX" from Wyatt Technology Corporation, Santa Barbara, Calif.). Data were collected and analyzed using software obtained under the trade designation "ASTRA" (Version 6) from Wyatt Technology Corporation. The column compartment, viscometer and differential refractive index detector were set to 40° C.

Nuclear Magnetic Resonance (NMR)

$^1$H NMR spectra were recorded on a spectrometer (obtained under the trade designation "BRUKER AVANCE III 500 MHz NMR" from Bruker Corporation, Billerica, Mass.) and calibrated with reference to solvent resonance (residual CHCl$_3$ in CDCl$_3$, 7.24 ppm).

Measurement of the Glass Transition Temperature by Differential Scanning Calorimetry (DSC)

The glass transition temperature, $T_g$, of the constituent blocks of a series of block copolymers was measured by differential scanning calorimetry (DSC) (obtained under the trade designation "TA INSTRUMENTS Q2000" from TA Instrument, New Castle, Del.). Block copolymer powder was loaded into DSC pans and subjected to the following thermal treatment: equilibrate at 40° C., heat at 10° C./min. to 180° C. or 200° C., cool at 5° C./min. or 10° C./min. to −85° C., heat to 200° C. at 10° C./min. The $T_g$ was determined as the inflection point in the heat flow curve at the step change in heat flow that accompanies the glass transition.

Atomic Force Microscopy (AFM) Imaging

Atomic Force Microscopy (AFM) is an imaging technique that consists of a flexible cantilever with a sharp tip attached to the cantilever's free end. AFM makes use of the forces of interaction between the tip and sample which cause the cantilever to deflect as it scans across the surface. At each x-y position, the cantilever deflection is measured via a laser beam reflected off the cantilever's backside and detected by a photodiode. The z(x,y) data is used to construct a three-dimensional topography map of the surface. In Tapping Mode AFM, the tip/cantilever assembly is oscillated at the resonant frequency of the cantilever; the amplitude of vertical oscillation is the input parameter for the feedback loop. In a topographic AFM image, "brighter regions" correspond to peaks while "darker regions" correspond to valleys.

Tapping Mode AFM was performed using an AFM microscope (obtained under the trade designation "BRUKER DIMENSION ICON" from Bruker Nano Inc., Santa Barbara, Calif.) with silicon cantilever tips with an aluminum backside coating (obtained under the trade designation "OTESPA-R3" from Bruker Nano Inc., Santa Barbara, Calif.), with a nominal resonant frequency of 300 kHz, spring constant of 40 N/m, and tip radius of 7 nm. The tapping amplitude setpoint is typically 85% of the free air amplitude. All AFM measurements were performed under ambient conditions. An offline data processing software (obtained under the trade designation "NANOSCOPE ANALYSIS V1.7" from Bruker Nano Inc.) was used for image processing and analysis. When necessary, images were applied with 0th order flatten (to remove z-offsets or horizontal skip artifacts) or a first order planefit (to remove sample tilt). In some cases, to enhance visualization of features, the images were processed with a 3rd order plane fit (removes tilt and bow in image).

Scanning Electron Microscopy (SEM) Imaging

The air side of sample EX-1D was imaged on a field emission scanning electron microscope (obtained under the trade designation "HITACHI S-4700" from Hitachi America, Ltd., Tarrytown, N.Y.). The sample was cut into a small piece to fit on to a flat mounting stub. The sample was adhered to the stub with double sided tape. Carbon paint was applied to all the edges. A thin layer of gold/palladium was deposited to improve surface conductivity of the sample. The sample was imaged using the following conditions: 3.0 kV, 6 mm working distance (WD), condenser lens (CL) setting=9, tilt=0° and magnification of 50 kx.

Cross-sections of EX-1C and EX-1D were made by cryogenic fracturing and mounted to cross-sectional SEM stubs using carbon tape. A thin layer of gold was sputter coated on the samples to make them conductive. Images were taken at magnifications close to 1000× using an SEM microscope (obtained under the trade designation "PHENOM" from Phenom-World, Eindhoven, The Netherlands). SEM instrument conditions included accelerating voltage of 5.0 kV and 2-11.5 mm working distance.

Preparatory Example 1 (PE-1): TDBMS-Terminated Poly(isoprene-block-styrene) Block Copolymer (IS-OR)

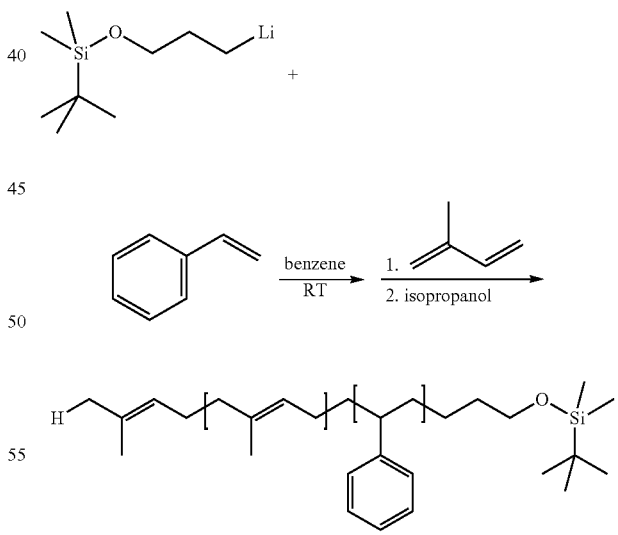

The synthesis of PE-1A is provided as a representative example. Appropriate alterations in the amount of styrene, isoprene, and initiator provided additional materials of PE-1.

In the glovebox, benzene (about 600 mL) and styrene (36.13 grams (g), 347 millimole (mmol)) were added to 1 L side-arm flask with stirbar. Under vigorous stirring, protected initiator TBDMSPL (0.68 mL, 0.68 mmol) was rapidly injected with a syringe. The polymerization was allowed to stir at room temperature in the glovebox for 48 hours. Isoprene (20.52 g, 301 mmol) was then added. The polymerization was stirred for an additional 24 hours over which time it became more viscous.

The polymerization was quenched with degassed isopropanol 24 hours after the introduction of isoprene. The polymer was then dried under reduced pressure and redissolved in about 400 mL THF. The polymer was isolated by precipitation from cold methanol. The polymer was once again dried, dissolved, and precipitated for a total of 2 precipitations to afford a white, dense solid.

The polymer composition was determined by $^1$H-NMR. Polymer molecular weight and dispersity were determined by GPC. Results are summarized in Table 2, below.

TABLE 2

| Sample | Mass % Isoprene | Mass % Styrene | Mw Final Product, kg/mol | IS-OR Polydispersity (PDI) |
|---|---|---|---|---|
| PE-1A | 36.0 | 64.0 | 88 | 1.01 |
| PE-1B | 33.5 | 65.5 | 101 | 1.02 |
| PE-1C | 35.6 | 64.4 | 140 | 1.01 |
| PE-1D | 38.6 | 61.4 | 104 | 1.02 |

Preparatory Example 2 (PE-2): Hydrogenation of IS-OH Block Copolymers: Synthesis of PEP-PCHE-OH

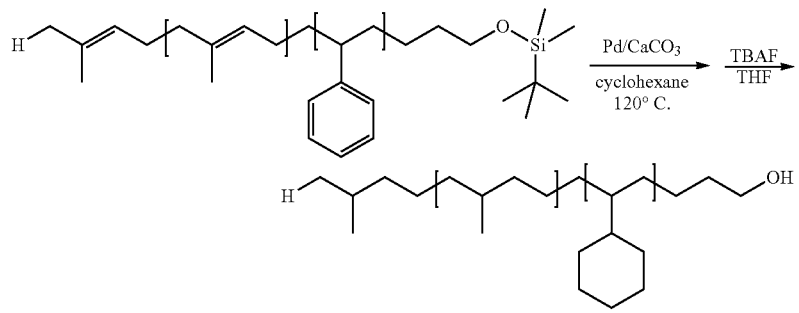

The synthesis of PE-2B is provided as a representative example. Appropriate alterations in the amount of styrene, isoprene, and initiator provided additional materials of PE-2.

In the glovebox, polymer (58.0 g, PI-PS-OR, PE-1B) was dissolved in cyclohexane (about 750 mL). Pd/CaCO$_3$ catalyst (7.5 g) was introduced into the polymer solution and suspended under vigorous stirring. The polymer solution was then added to a clean 2 L Parr reactor fitted with a glass insert before the reactor was sealed.

Once sealed, the reactor was placed under a hydrogen atmosphere by four cycles of pressurizing (200 psi, 1.38 MPa) and venting while stirring. After a hydrogen atmosphere had been established, the reactor was pressurized to 200 psi (1.38 MPa) and heating to 120° C. was initiated while vigorously stirring. Once a temperature of 120° C. had been reached, the reactor was pressurized to 500 psi (3.45 MPa) with hydrogen. Hydrogenation occurred over the next five days as about 640 psi (4.41 MPa) of hydrogen was consumed; hydrogen was periodically added to maintain a pressure above 420 psi (2.90 MPa).

After five days, the reactor was cooled to room temperature before being vented. Once vented, the reactor was opened and about 200 mL of cyclohexane was added to the suspension. The polymer solution was filtered through diatomaceous earth (obtained under the trade designation "CELITE" from Sigma Aldrich Co. LLC) to give a clear, water-white solution. This solution was then reduced to dryness on the rotovap.

Once dried, the polymer was redissolved in about 400 mL THF. TBAF (5.0 mL, excess, 1.0 M in THF) was added and the solution stirred at room temperature under Ar for 18 hours. Occasionally, the polymer solution will change color slightly to light yellow. After 18 hours, the polymer solution was passed through silica gel to remove excess TBAF; additional THF was added to induce filtration. The solution was once again reduced in volume on the rotovap to about 400 mL and the polymer was precipitated by addition to cold methanol. A fine white solid resulted which was isolated by filtration. The polymer was dried in a vacuum oven at 60° C. overnight.

The polymer composition was determined by $^1$H-NMR. Polymer molecular weight and dispersity were determined by GPC. Results for additional hydrogenations are displayed in Table 3, below.

TABLE 3

| Sample | Precursor Polymer | Hydrogenation, % C=C Consumed | PEP-PCHE-OH Polydispersity (PDI) |
|---|---|---|---|
| PE-2A | PE-1A | ~50 | 1.03 |
| PE-2B | PE-1B | >95 | 1.02 |
| PE-2C | PE-1C | ~45 | 1.07 |

Preparatory Example 3 (PE-3): Addition of L-Lactide to Form PEP-PCHE-(L-PLA)

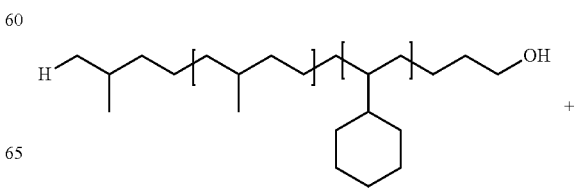

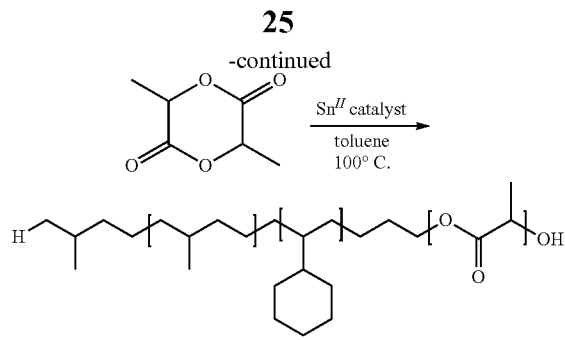

The synthesis of PE-3B is provided as a representative example. Appropriate alterations in the amount of styrene, isoprene, and initiator provided additional materials of PE-3.

In the glovebox, PEP-PCHE-OH (PE-2B, 14.3 g) was added to a 150 mL glass pressure vessel equipped with a glass stirbar. Toluene (108 mL) was then added and the solution stirred until the polymer was completely dissolved. L-lactide (9.3 g, 65 mmol) was then added followed by addition of a toluene Sn(II) catalyst solution (445 microL, 64.97 mg, 0.160 mmol tin(II) ethylhexanoate) resulting in a clear suspension. The flask was then sealed and brought out of the glovebox. The pressure vessel was then placed in an oil bath preheated to 105° C.

After 130 minutes, the pressure vessel was placed in an ice bath to halt further polymerization. The reaction was then precipitated from isopropanol to give a stringy white solid. The solid was dried, redissolved in about 40 mL THF, and precipitated once more from methanol. After drying overnight at 60° C. under high vacuum, NMR and GPC data were collected. The polymer composition was determined by $^1$H-NMR. Polymer molecular weight and dispersity were determined by GPC. Results are summarized in Table 4, below.

TABLE 4

| Sample Designation | Precursor Polymer | Hydrogenation, % C=C Consumed | Mass % PEP-PCHE | Mass % L-PLA | PDI |
| --- | --- | --- | --- | --- | --- |
| PE-3A | PE-2A | ~50 | 76.0 | 24.0 | 1.11 |
| PE-3B | PE-2B | >95 | 72.9 | 27.1 | 1.02 |
| PE-3C | PE-2C | ~45 | 82.9 | 17.1 | 1.06 |
| PE-3D | PE-2C | ~45 | 83.9 | 16.1 | 1.03 |
| PE-3E | PE-2C | ~45 | 72.0 | 28.0 | 1.05 |
| PE-3F | PE2-B | >95 | 65.7 | 34.3 | 1.03 |

Preparatory Example 4 (PE-4): Synthesis of PI-PS-OH

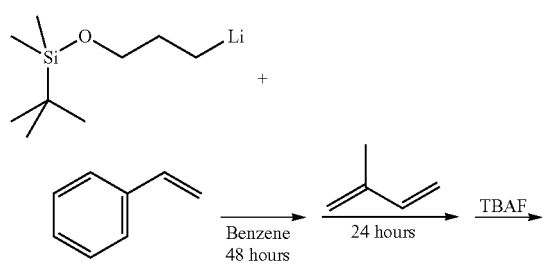

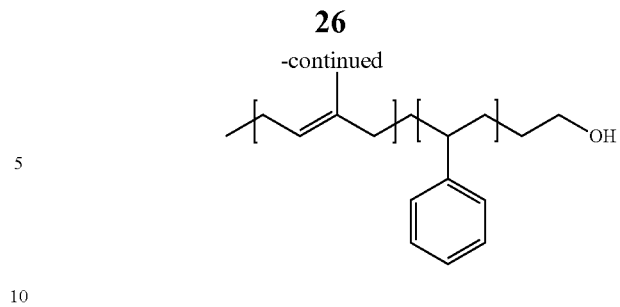

In a glovebox, benzene (about 600 mL) and styrene (41.7 g) were added to 1 L side-arm flask. Under vigorous stirring, TBDMSPL (0.66 mL, 0.66 mmol) was rapidly injected with a syringe. The polymerization was allowed to stir at room temperature in the glovebox for 48 hours. After 48 hours, isoprene (23.67 g) was added. The polymerization was stirred for an additional 24 hours over which time it became more viscous.

The polymerization was quenched with degassed isopropanol 24 hours after introduction of isoprene. Polymer was then dried under reduced pressure and redissolved in ~400 mL THF. Once dissolved, terminal hydroxyl protecting groups were deprotected with 10 mL TBAF in THF (1.0 M) by stirring overnight a room temperature under a nitrogen blanket (bubbler). The next morning, 8 mL acetic acid was added. 30 minutes later, polymer was isolated by precipitation from cold methanol. Polymer was once again dried, dissolved, and precipitated for a total of 2 precipitations to afford a white, dense solid.

NMR analysis showed an isoprene mass percent composition of 38.6 and a styrene mass percent composition of 61.4. GPC studies indicated a Mw of 104 kg/mol and a PDI of 1.02.

Preparatory Example 5 (PE-5): Addition of L-Lactide to PI-PS-OH to Form PI-PS-(L-PLA)

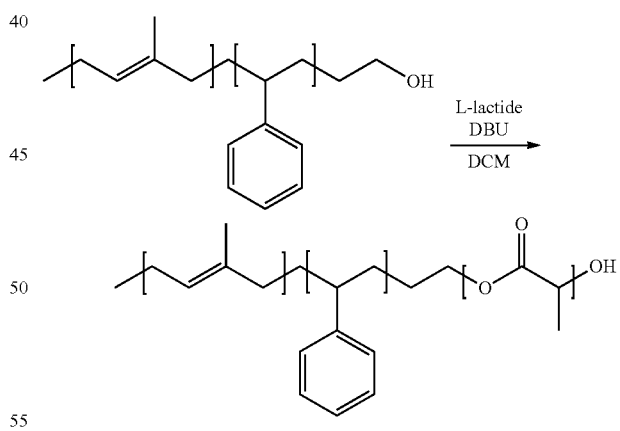

PI-PS-OH (PE-4, 15.4 g), rac-lactide (6.0 g), and CH$_2$Cl$_2$ (105 mL) were added to a sealable glass pressure vessel equipped with a stir bar. The contents were stirred until completely dissolved. Once dissolved, DBU (300 microL) was quickly added in conjunction with rapid agitation. The reaction was sealed, brought out of the glovebox, and placed on a stir plate. Over the course of 20 minutes, the viscosity reaction visibly increased. After 1 hour of reaction time, several large flakes of benzoic acid were introduced, and solvent was removed via rotary evaporation. The remaining solid was redissolved in minimal THF and the polymer precipitated from room temperature methanol. Precipitation was repeated from THF/methanol and a white solid was obtained. The polymer was dried overnight in a vacuum oven set at 60° C.

Polymer composition was determined by $^1$H-NMR, polymer molecular weight and dispersity by GPC analysis (Table 5, below).

TABLE 5

| Sample ID | Mass % Isoprene | Mass % Styrene | Mass % Lactide | GPC Mw, g/mol | GPC PDI |
|---|---|---|---|---|---|
| PE-5 | 29.0 | 48.7 | 22.3 | 129 | 1.15 |

The glass transition temperatures of constituent blocks were measured using DSC, as discussed above. Table 6, below, summarizes the $T_g$ of constituent blocks of PE-5, PE-3A, PE-3C, PE-3D, and PE-3F, as well as the unsaturated precursor (PI-PS-OH, PE-1A) and partially saturated precursor (PEP-PCHE-OH, PE-2A) of PE-3A before the PLA chain extension.

TABLE 6

| | Hydrogenation | $T_g$, ° C. | | |
|---|---|---|---|---|
| Sample | Level, % | PI or PEP | PLA | PS or PCHE |
| PS* | 0 | — | — | 105 |
| PCHE* | 100 | — | — | 147 |
| PE-5 | 0 | −65 | 52 | 103 |
| PE-1A** | 0 | −59 | — | 108 |
| PE-2A*** | ~50 | −62 | — | 117 |
| PE-3A | ~50 | −56 | 57 | 117 |
| PE-3C | ~45 | −60 | 55 | 115 |
| PE-3D | ~45 | −61 | 56 | 117 |
| PE-3F | >95 | −58 | 58 | 140 |

*reported in Hucul et al., Adv. Mater., 12, pp. 1855-1858 (2000).
**PE-2A precursor, before hydrogenation
***PE-3A precursor, after hydrogenation, before PLA chain extension Membrane Casting The block copolymers were dissolved in solvent mixtures at concentrations of 9-15 wt. % to obtain a uniform casting solution. A plastic film sheet was used as a temporary support during casting. The coating solutions were cast onto the film using a coating applicator with a gap height of 10 mil (254 micrometers). Following an evaporation period of 0-40 seconds, the coated sheets were introduced into a DI water bath for the coating to undergo phase separation and form a membrane structure.

Figure 1B:
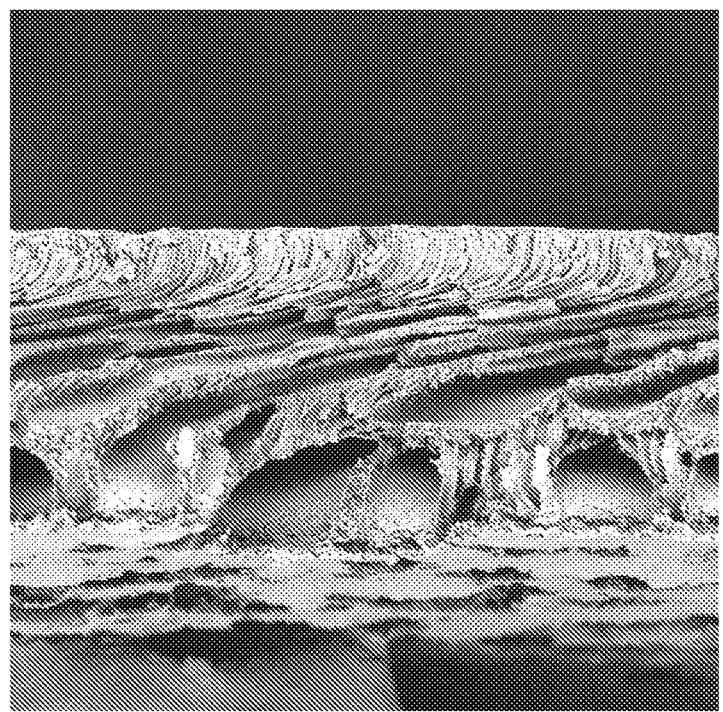
Figure 1C:
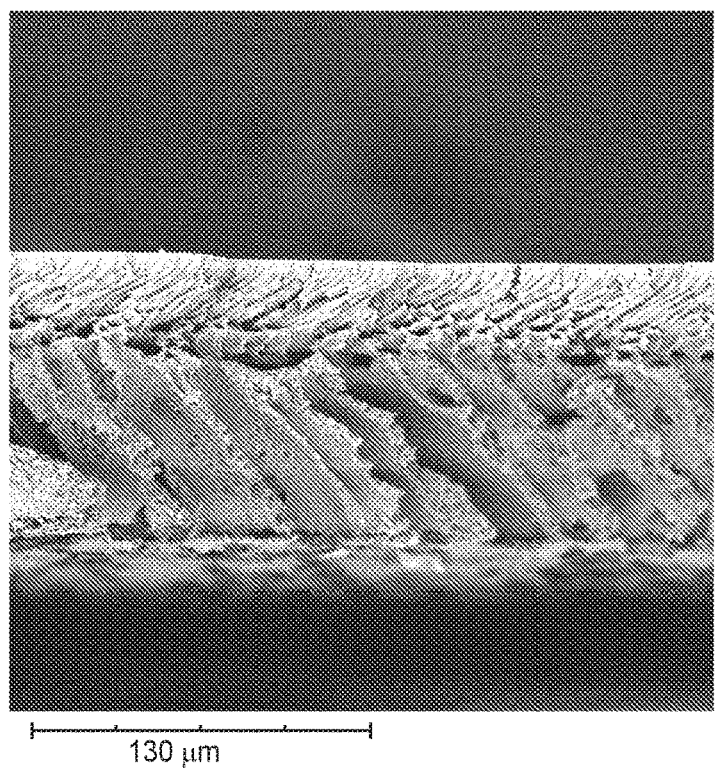

Samples of PE-3A were dissolved in mixtures of NMP/THF at concentrations of 12.5 and 15 wt. %. Immediately after casting, the wet films were transferred to a water (coagulation) bath to effect phase inversion. Membrane samples were transferred from the coagulation bath to a fresh water bath for 1 hour before being dried at room temperature. Samples appeared opaque. The surface of sample EX-1D was examined by SEM at 50 kx (FIG. 1A). The cross sections of samples EX-1C (FIG. 1B) and EX-1D (FIG. 1C) were examined by SEM at 1160× and 880×, respectively. See Table 7, below, for a list of samples, their casting conditions and their surface appearance by SEM.

TABLE 7

| Sample | Wt. % | Solvent, w/w | Surface Appearance by SEM |
|---|---|---|---|
| EX-1A | 15 | 50/50 NMP/THF | — |
| EX-1B | 15 | 75/25 NMP/THF | — |
| EX-1C | 12.5 | 60/40 NMP/THF | — |
| EX-1D | 12.5 | 70/30 NMP/THF | Spherical micelle network |
| EX-1E | 12.5 | 80/20 NMP/THF | — |

Figure 2:
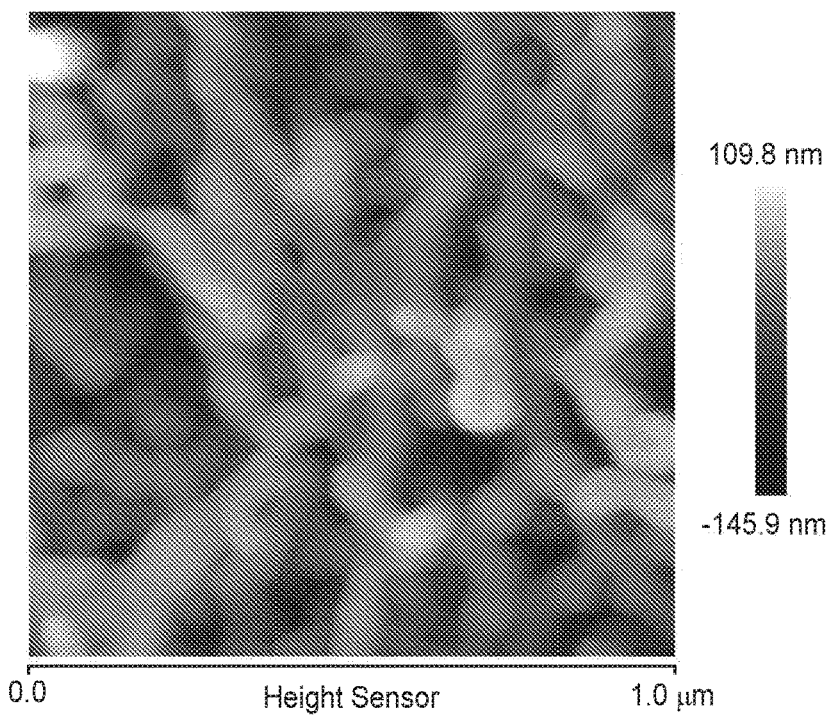
FIG. 2 is an atomic force microscopy (AFM) image of sample EX-2E.

Samples of PE-3C were dissolved in mixtures of 70/30 THF/NMP at concentrations of 9, 10, and 11 wt. %. Following 20-40 seconds evaporation time, the wet films were transferred to a coagulation bath to effect phase inversion. Membrane samples were transferred from the coagulation bath to a fresh water bath for >1 hour before being dried at room temperature. Samples appeared opaque. The surface of the membranes were examined by AFM (1 micrometer×1 micrometer regions). See Table 8, below, for a list of samples, their casting conditions and their appearance by AFM. See FIG. 2 for the AFM image of sample EX-2C.

TABLE 8

| Sample | Wt. % | Solvent, w/w | Evap. Time | Appearance by AFM |
|---|---|---|---|---|
| EX-2A | 9 | 70/30 THF/NMP | 40 s | Random network |
| EX-2B | 10 | 70/30 THF/NMP | 20 s | Random network |
| EX-2C | | | 30 s | Random network |
| EX-2D | | | 40 s | Clumped spherical micelles |
| EX-2E | 11 | 70/30 THF/NMP | 20 s | Random network |
| EX-2F | | | 30 s | Random network |
| EX-2G | | | 35 s | Clumped spherical micelles |

Samples Cast from PE-3D

Samples of PE-3D were dissolved in mixtures of 70/30 THF/NMP at concentrations of 10 and 11 wt. %. Following 30-40 second evaporation time, the wet films were transferred to a coagulation bath to effect phase inversion. Membrane samples were transferred from the coagulation bath to a fresh water bath for >1 hour before being dried at room temperature. Samples appeared opaque. The surface of the membranes were examined by AFM (1 micrometer×1 micrometer and 2 micrometers×2 micrometers regions). See Table 9, below, for a list of samples, their casting conditions and their appearance by AFM.

TABLE 9

| Sample | Wt. % | Solvent, w/w | Evap. Time | Appearance by AFM |
|---|---|---|---|---|
| EX-3A | 10 | 70/30 THF/NMP | 20 s | Random network |
| EX-3B | | | 30 s | Random network |
| EX-3C | | | 4 0 s | Clumped spherical micelles |
| EX-3D | 11 | 70/30 THF/NMP | 20 s | Random network |
| EX-3E | | | 30 s | Clumped spherical micelles |

Samples Cast from PE-3E

Samples of PE-3E were dissolved in mixtures of 70/30 or 80/20 THF/NMP at concentrations of 10-12 wt. %. Following 5-30 seconds evaporation time, the wet films were transferred to a coagulation bath to effect phase inversion. Membrane samples were transferred from the coagulation bath to a fresh water bath for >1 hour before being dried at room temperature. The surface of the membranes were examined by AFM (1 micrometer×1 micrometer regions).

See Table 10, below, for a list of samples, their casting conditions and their appearance by AFM.

TABLE 10

| Sample | Wt. % | Solvent, w/w | Evap. Time | Appearance by AFM |
|---|---|---|---|---|
| EX-4A | 10 | 70/30 THF/NMP | 15 s | Random network |
| EX-4B | | | 20 s | Loose-packed spherical micelles |
| EX-4C | | | 30 s | Spherical and columnar micelles |
| EX-4D | 10 | 80/20 THF/NMP | 10 s | Nonporous |
| EX-4E | | | 15 s | Random network mixed with micelles |
| EX-4F | | | 20 s | Sparse pores |
| EX-4G | 11 | 80/20 THF/NMP | 10 s | Random network |
| EX-4H | | | 15 s | Random network |
| EX-4I | | | 20 s | Sparse pores |
| EX-4J | 12 | 80/20 THF/NMP | 5 s | Nonporous |
| EX-4K | | | 10 s | Random network mixed with micelles |
| EX-4L | | | 15 s | Sparse pores |

Samples Cast from PE-3B

Figure 3:
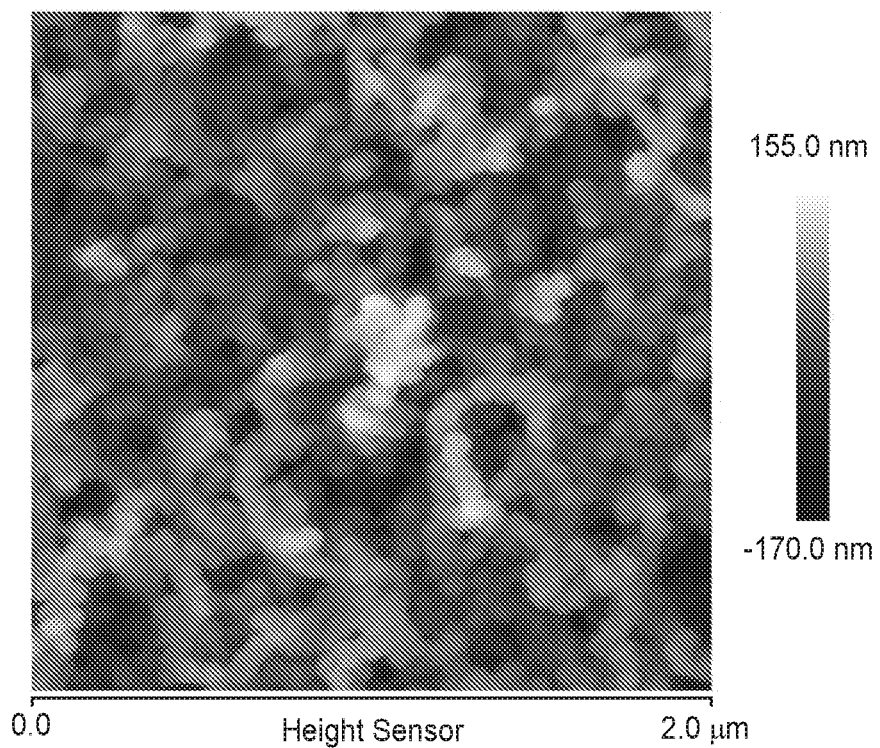
FIG. 3 is an AFM image of sample EX-51.

Samples of PE-3B were dissolved in mixtures of THF/NMP at concentrations of 10-15 wt. %. Following 15-30 seconds evaporation time, the wet films were transferred to a coagulation bath to effect phase inversion. Membrane samples were transferred from the coagulation bath to a fresh water bath for >1 hour before being dried at room temperature. The surface of the membranes were examined by AFM and found to be varied arrangements of spherical micelles (2 micrometers×2 micrometers regions). See Table 11, below, for a list of samples, their casting conditions and their appearance by AFM. See FIG. 3 for the AFM image of Sample EX-51.

TABLE 11

| Sample | Wt. % | Solvent, w/w | Evap. Time | Appearance by AFM |
|---|---|---|---|---|
| EX-5A | 15 | 50/50 THF/NMP | 15 s | Loose-packed spherical micelles |
| EX-5B | | | 20 s | Loose-packed spherical micelles |
| EX-5C | | | 30 s | Clumped spherical micelles |
| EX-5D | 10 | 60/40 THF/NMP | 20 s | Clumped spherical micelles |
| EX-5E | | | 30 s | Clumped spherical micelles |
| EX-5F | 15 | 60/40 THF/NMP | 15 s | Loose-packed spherical micelles |
| EX-5G | | | 20 s | Loose-packed spherical micelles |
| EX-5H | | | 30 s | Packed spherical micelles |
| EX-5I | 12 | 70/30 THF/NMP | 30 s | Clumped spherical micelles |
| EX-5J | 14 | 70/30 THF/NMP | 20 s | Loose-packed spherical micelles |
| EX-5K | | | 30 s | Loose-packed spherical micelles |

Testing of PCL Membrane Sample for Retention

A dextran solution comprising a mixture of different molecular weights was prepared (0.4 g/L of 6 kDa dextran, 0.4 g/L of 40 kDa dextran, 0.25 g/L of 100 kDa dextran, 0.35 g/L of 500 kDa dextran and 0.95 g/L of 2000 kDa dextran) in water ("MilliQ Water") and shaken until the dextran was fully dissolved.

Membrane EX-3B was tested for retention of the dextran mixture. Discs 25 mm in diameter were punched from the membrane and tested in 10 mL stirred cell (obtained under the trade name "AMICON" from EMD Millipore Corporation, Billerica, Mass.) with an open nonwoven scrim placed downstream of the membrane for mechanical support. The samples were first conditioned by flowing through water ("MilliQ water") for 15 minutes. The water was then replaced with the dextran solution, and samples were challenged with the dextran mixture at 1.38 bar (20 psi) with 400 rpm stirring. The first 1 mL of permeate was discarded and the second 1 mL of permeate was collected for measurement. The challenge and measurement solutions were analyzed by aqueous gel permeation chromatography (obtained under the trade name "1260 INFINITY" from Agilent Technologies) to determine relative retention at different molecular weights as calibrated using poly(ethylene oxide) (PEO) standards (obtained from Agilent Technologies). The system comprised a column (obtained under the trade designation "PL AQUAGEL-OH 40" from Agilent Technologies) operating at 35° C. with a refractive index detector (obtained under the trade name "1260 INFINITY" from Agilent Technologies) and samples were analyzed at a flow rate of 1 mL/min. Three membrane samples were tested. The most retentive sample showed 90% retention of the mixture at 220 kDa dextran; the other two samples showed low retention or no retention.

Figure 4:
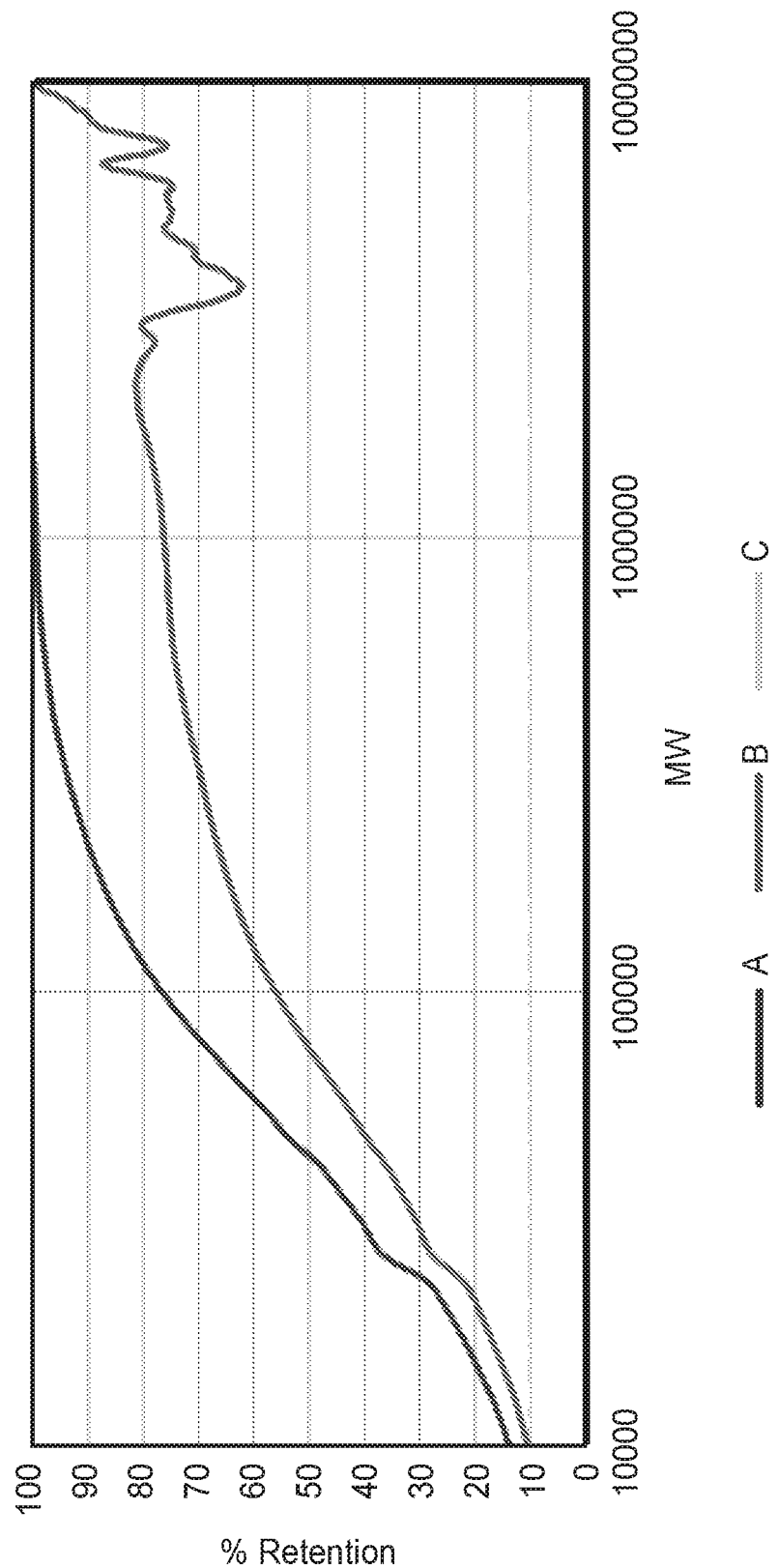
FIG. 4 shows percent retention as a function of molecular weight (MW) for sample EX-3B.

Percent Retention as a function of molecular weight (MW) is seen in FIG. 4.

Unhydrogenated Triblock Copolymer Membrane for Comparative Testing

Comparative membranes from unhydrogenated PE-5 were prepared by dissolving the polymer in mixtures of 40/60 DMF/THF at concentrations of 12 and 15 wt. %. Following 15-20 seconds evaporation time, the wet films were transferred to a coagulation bath to effect phase inversion. Membrane samples were transferred from the coagulation bath to a fresh water bath for >1 hour before being dried at room temperature. The surface of the membranes were examined by AFM (1 micrometer×1 micrometer regions). See Table 12, below, for a list of samples, their casting conditions and their appearance by AFM.

TABLE 12

| Sample | Wt. % | Solvent, w/w | Evap. Time | Appearance by AFM |
|---|---|---|---|---|
| CE-1A | 12 | 40/60 DMF/THF | 15 s | Random network |
| CE-1B | | | 20 s | Random network |
| CE-1C | 15 | | 20 s | Random network |

Membrane Heat Stability

The following membrane samples were chosen for evaluation of morphological stability under heating: CE-1A, CE-1B, CE-2, EX-2A, and EX-3C. For heat stability evaluation, small pieces of membrane sample were fixed using double-sided tape to glass slides. These glass slides were placed into a heated oven under vacuum for 10 minutes at a series of temperatures (80° C., 95° C., 110° C., 120° C., 130° C.). The surface morphologies of the samples after holding at each temperature were then evaluated using AFM (1 micrometer×1 micrometer regions).

All three unhydrogenated membranes (CE-1A, CE-1B, CE-2) showed substantial change in their surface morphology by AFM even at 80° C., the lowest temperature measured. Meanwhile, the hydrogenated membranes (EX-2A and EX-3C) showed little change at 80° C. and some coarsening starting at 95° C.

Thus, various embodiments of the POROUS MEMBRANES INCLUDING TRIBLOCK COPOLYMERS are disclosed. Although reference is made herein to the accompanying set of drawings that form part of this disclosure, one of at least ordinary skill in the art will appreciate that various adaptations and modifications of the embodiments described herein are within, or do not depart from, the scope of this disclosure. For example, aspects of the embodiments described herein may be combined in a variety of ways with each other. Therefore, it is to be understood that, within the scope of the appended claims, the claimed invention may be practiced other than as explicitly described herein.

The complete disclosures of the patents, patent documents, and publications cited herein are incorporated by reference in their entirety as if each were individually incorporated. To the extent that there is any conflict or discrepancy between this specification as written and the disclosure in any document that is incorporated by reference herein, this specification as written will control. Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of the disclosure intended to be limited only by the claims set forth herein as follows.

What is claimed is:

1. A porous membrane comprising a triblock copolymer of the formula ABC wherein:
   B is a hydrogenated vinyl aromatic block present in a range from 30 to 90 weight percent, based on the total weight of the copolymer and having a $T_g$ of $\geq 110°$ C.;
   C is a rubbery block present in a range from 10 to 70 weight percent, based on the total weight of the copolymer and having a $T_g \leq 25°$ C.; and
   A is substantially incompatible with both the B and C blocks and is derived from ring-opening polymerization,
   wherein B+C is present in a range from 70 to 95 weight percent, based on the total weight of the copolymer.

2. The porous membrane of claim 1, wherein the porous membrane is an integral asymmetric membrane.

3. The porous membrane of claim 1, wherein the B block has a residual unsaturation of not greater than 55 mol %.

4. The porous membrane of claim 1, wherein the B block has a residual unsaturation of not greater than 10 mol %.

5. The porous membrane of claim 1, wherein the A block is present in a range from 5 to 30 weight percent, based on the total weight of the copolymer.

6. The porous membrane of claim 1, wherein the B block is present in a range from 60 to 90 weight percent, based on the total weight of the copolymer.

7. The porous membrane of claim 1, wherein the C block is present in a range from 10 to 40 weight percent, based on the total weight of the copolymer.

8. The porous membrane of claim 1,
   wherein the B block is selected from at least partially hydrogenated styrene, α-methyl styrene, 4-methyl styrene, 3-methyl styrene, 4-ethyl styrene, 3,4-dimethyl styrene, 2,4,6-trimethylstyrene, 3-tert-butyl-styrene, 4-tert-butylstyrene, 4-methoxystyrene, 4-trimethylsilylstyrene, 2,6-dichlorostyrene, vinyl naphthalene, 4-chlorostyrene, 3-chlorostyrene, 4-fluorostyrene, 4-bromostyrene, vinyl toluene, ethylstyrene, diethyl styrene, di-n-butylstyrene, isopropylstyrene, other alkylated-styrenes, styrene analogs, vinyl naphthalene, and vinyl anthracene;
   wherein the C block is selected from hydrogenated butadiene, isoprene, ethylbutadiene, phenylbutadiene, piperylene, pentadiene, hexadiene, ethylhexadiene, and dimethylbutadiene 1,3-cyclodiene monomers;
   wherein the A block are polyethers selected from poly(ethylene oxide), poly(propylene oxide), poly(ethoxyethyl-glycidylether), poly(vinylglycidylether), poly(methylglycidylether), poly(ethylglycidylether), poly(propylglycidylether), poly(butylglycidylether), glycidol, and copolymers thereof derived from ring-opening polymerization of cyclic ethers.

9. The porous membrane of claim 1, wherein the $M_n$ of the triblock copolymer is 60-500 kDa.

10. The porous membrane of claim 1, wherein the porous membrane has a dry thickness in a range from 0.5 to 500 micrometers.

11. A shaped article comprising the porous membrane of claim 1 that is a free-standing flat sheet, a supported flat sheet, or a hollow fiber.

12. A filter comprising the porous membrane of claim 1.

13. A kit comprising:
    a filter comprising the porous membrane of claim 1; and
    a package for containing the filter.

14. The kit of claim 13, wherein the package comprises information related to the filter or a use thereof.

15. The kit of claim 13, further comprising a filter support.

16. The kit of claim 13, further comprising a receptacle.

17. A method of preparing a porous membrane, the method comprising:
    dissolving a triblock copolymer of the formula ABC in a solvent system to form a triblock copolymer solution wherein:
       B is a hydrogenated vinyl aromatic block present in a range from 30 to 90 weight percent, based on the total weight of the copolymer and having a $T_g$ of $\geq 110°$ C.;
       C is a rubbery block present in a range from 10 to 70 weight percent, based on the total weight of the copolymer and having a $T_g \leq 25°$ C.; and
       A is substantially incompatible with both the B and C blocks and is derived from ring-opening polymerization,
       wherein B+C is present in a range from 70 to 95 weight percent, based on the total weight of the copolymer;
    forming a precursor article from the triblock copolymer solution;
    removing at least a portion of the solvent system from the precursor article to form a partially dried precursor article; and
    contacting the partially dried precursor article with a nonsolvent, thereby forming the porous membrane.

18. The method of claim 17, wherein the triblock copolymer solution contains the triblock copolymer in a range from 9 to 15 weight percent, based on the total weight of the triblock copolymer solution.

19. The method of claim 17, wherein the precursor article is formed using a notch bar coater, knife coater, or a spin coater.

20. The method of claim 17, wherein the triblock copolymer solution is cast onto a substrate using a notch bar coater having a coating gap in a range from 25 to 375 micrometers.

* * * * *